United States Patent
Roodenburg et al.

(10) Patent No.: US 9,822,906 B2
(45) Date of Patent: Nov. 21, 2017

(54) MARINE PIPELAYING AND METHOD FOR ABANDONMENT OF A PIPELINE

(71) Applicant: ITREC B.V., Schiedam (NL)

(72) Inventors: Joop Roodenburg, Delft (NL); Terence Willem August Vehmeijer, The Hague (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 15/030,829

(22) PCT Filed: Oct. 16, 2014

(86) PCT No.: PCT/NL2014/050722
§ 371 (c)(1),
(2) Date: Apr. 20, 2016

(87) PCT Pub. No.: WO2015/069099
PCT Pub. Date: May 14, 2015

(65) Prior Publication Data
US 2016/0252195 A1    Sep. 1, 2016

(30) Foreign Application Priority Data
Nov. 6, 2013   (NL) ...................................... 2011746

(51) Int. Cl.
*F16L 1/12* (2006.01)
*F16L 1/26* (2006.01)
(Continued)

(52) U.S. Cl.
CPC ................. *F16L 1/205* (2013.01); *F16L 1/16* (2013.01); *F16L 1/207* (2013.01); *F16L 1/23* (2013.01);
(Continued)

(58) Field of Classification Search
CPC ..... F16L 1/12; F16L 1/26; F16L 1/205; F16L 1/225; F16L 1/235; F16L 1/20;
(Continued)

(56) References Cited

U.S. PATENT DOCUMENTS 5,348,423 A * 9/1994 Maloberti ................. F16L 1/19
405/166
5,975,802 A * 11/1999 Willis ....................... F16L 1/15
405/166

(Continued)

FOREIGN PATENT DOCUMENTS

| WO | WO 2007/108673 A1 | 9/2007 |
| WO | WO 2009/134116 A1 | 11/2009 |
| WO | WO 2012/091556 A1 | 7/2012 |

*Primary Examiner* — Benjamin Fiorello
*Assistant Examiner* — Edwin Toledo-Duran
(74) *Attorney, Agent, or Firm* — Birch, Stewart, Kolasch & Birch, LLP

(57) ABSTRACT

A method is provided for installing a pipeline on the seabed from a marine pipelaying vessel, including initiation, pipelaying, and abandonment of the pipeline. An embodiment of the abandonment of the pipeline includes halting pipelaying and engaging a hang-off clamp with the pipeline at a position below one or more tensioners, transferring the weight onto the hang-off clamp and holding the seagoing pipeline in the firing line, severing the pipeline, connecting the initiation cable to the lower end of the pipeline held by the one or more tensioners, transferring pipeline tension onto the initiation cable, releasing the one or more tensioners, so that a section of the pipeline is held in the firing line between the pipeline diverter and the initiation cable, vacating the firing line by at least displacing both the pipeline diverter and the initiation cable sheave and thereby displacing said section of the pipeline from the firing line, arranging the A&R cable in the firing line, connecting the A&R cable to the upper end of the seagoing pipeline held in the firing line, releasing the (Continued)

hang-off clamp, and operating the A&R winch and thereby lowering the pipeline onto the seabed.

20 Claims, 28 Drawing Sheets

(51) Int. Cl.
    *F16L 1/20*     (2006.01)
    *F16L 1/16*     (2006.01)
    *F16L 1/23*     (2006.01)
    *F16L 1/235*     (2006.01)
    *F16L 3/01*     (2006.01)
    *F16L 3/12*     (2006.01)

(52) U.S. Cl.
    CPC ............... *F16L 1/235* (2013.01); *F16L 3/012* (2013.01); *F16L 3/1218* (2013.01); *F16L 3/1222* (2013.01)

(58) Field of Classification Search
    CPC ... F16L 1/203; F16L 1/23; F16L 1/161; F16L 1/24; F16L 1/201; F16L 1/166; E02F 5/104; E02F 5/105; E02F 5/107; E02F 5/106; B63B 35/03
    USPC ............................ 405/158–173; 166/376–378
    See application file for complete search history.

(56) References Cited

U.S. PATENT DOCUMENTS

| | | | | |
|---|---|---|---|---|
| 6,056,478 A | * | 5/2000 | Martin | F16L 1/203 |
| | | | | 405/158 |
| 6,352,388 B1 | * | 3/2002 | Seguin | B63B 35/03 |
| | | | | 405/166 |
| 6,524,030 B1 | * | 2/2003 | Giovannini | B63B 35/03 |
| | | | | 405/166 |
| 7,189,028 B1 | * | 3/2007 | Signaroldi | B63B 35/03 |
| | | | | 405/166 |
| 7,938,598 B2 | * | 5/2011 | Roodenburg | F16L 1/15 |
| | | | | 405/168.1 |
| 8,905,676 B2 | * | 12/2014 | Roodenburg | F16L 1/19 |
| | | | | 405/168.1 |
| 9,255,651 B2 | * | 2/2016 | Roodenburg | F16L 1/19 |
| 9,404,604 B2 | * | 8/2016 | Maloberti | F16L 1/15 |
| 2003/0147699 A1 | * | 8/2003 | Long | F16L 1/203 |
| | | | | 405/158 |
| 2005/0265788 A1 | * | 12/2005 | Renkema | F16L 1/18 |
| | | | | 405/158 |
| 2008/0304912 A1 | * | 12/2008 | Roodenburg | F16L 1/14 |
| | | | | 405/168.3 |
| 2010/0054861 A1 | * | 3/2010 | Ardavanis | F16L 1/19 |
| | | | | 405/166 |
| 2010/0092244 A1 | * | 4/2010 | Willis | F16L 1/202 |
| | | | | 405/166 |
| 2010/0111612 A1 | * | 5/2010 | Narold | F16L 1/19 |
| | | | | 405/166 |
| 2010/0260552 A1 | * | 10/2010 | Hillenaar | B63B 35/03 |
| | | | | 405/166 |
| 2011/0097156 A1 | * | 4/2011 | Pose | B63B 35/03 |
| | | | | 405/166 |
| 2011/0158748 A1 | * | 6/2011 | Brocklebank | F16L 1/19 |
| | | | | 405/158 |
| 2011/0262229 A1 | * | 10/2011 | Tame | F16L 1/166 |
| | | | | 405/166 |
| 2013/0287498 A1 | * | 10/2013 | Roodenburg | F16L 1/19 |
| | | | | 405/168.3 |
| 2014/0294511 A1 | * | 10/2014 | Bianchi | F16L 1/207 |
| | | | | 405/168.4 |

\* cited by examiner

MARINE PIPELAYING AND METHOD FOR ABANDONMENT OF A PIPELINE

FIELD OF THE INVENTION

The present invention relates to the field of marine pipelaying, wherein a pipeline is laid from a marine pipelaying vessel onto the seabed. In particular the invention relates to the abandonment of the pipeline, which is often due to severe weather.

BACKGROUND OF THE INVENTION

Generally marine pipelaying vessels are equipped with an A&R system, which is an abbreviation of "abandonment and recovery system".

An example of a marine pipelaying vessel equipped with an A&R system is disclosed in WO2007/108673. This known vessel comprises a pipeline launch tower. A pipeline diverter is supported at an elevated position on the tower. Below the pipeline diverter there are retractable tensioners supported by the tower. A hang-off clamp allows to hold the seagoing pipeline when it has been severed from the pipeline section that is held by the tensioners. This known vessel also has an A & R system for abandonment and recovery of a pipeline. The A&R system comprises an A&R winch and A&R cable, as well as an arrangement of sheaves for this cable including an A&R cable suspension sheave that is displaceable mounted on the tower and allows to suspend the A&R cable in the firing line.

Whilst not specifically disclosed in WO2007/108673 it is common practice to provide such vessel with an initiation system for initiation of the pipelaying process. A known initiation system comprises an initiation winch and initiation cable. In an initiation procedure the initiation cable is passed—via an initiation cable sheave arranged generally underneath the lowermost tensioner—upward through the tensioners and then over the pipeline diverter, so that this cable can be connected to the pipeline to be laid. This pipeline is for example spooled onto a horizontal axis storage reel or in a vertical axis carousel storage. By operation of the initiation winch, which has a significant lower traction capacity than the A&R winch, the pipeline is pulled over the pipeline diverter and into the tensioners. Then the tensioners are made to engage on the pipeline and the initiation cable is disconnected.

A common A&R procedure, e.g. as possible with the vessel of WO2007/108673, comprises the steps of:
  halting the pipelaying and engaging the hang-off clamp with the pipeline at a position below the one or more tensioners,
  transferring the weight of the seagoing pipeline onto the hang-off clamp,
  severing the pipeline between the hang-off clamp and the one or more tensioners,
  connecting the A&R cable to the upper end of the seagoing pipeline held by the hang-off clamp,
  releasing the hang-off clamp,
  operating the A&R winch and thereby lowering the pipeline onto the seabed.

As water depths at which pipelaying is performed are very significant, with depths of over 1000 meters being no exception and depths in the range of 2000 meters and 3000 meters becoming more and more common, the requirements placed on A&R systems and corresponding A&R procedures are ever increasing.

For instance the major water depths cause the need for very significant load capacities of the A&R system at great depth.

A further factor is the speed and ease at which the abandonment procedure can be performed, e.g. the requirements on personnel involved and the time required to perform the abandonment in view of worsening weather conditions.

Yet another factor is the effect that the A&R procedure may have on the pipeline section that remains in the pipeline installation. For example in some known A&R procedures it is envisaged that the pipeline section which is held in the tensioners at the time of halting the pipelaying is discarded in the course of the abandonment procedure.

It has been found that existing A&R procedures and systems are not entirely satisfactory.

OBJECTS OF THE INVENTION

Therefore it is an object of the present invention to provide an improved method and pipelaying installation, in particular in view of the abandonment of the pipeline, e.g. in view of severe weather conditions.

SUMMARY OF THE INVENTION

The invention proposes a method, which is characterized in that the abandonment of the pipeline comprises:
  halting the pipelaying and engaging the hang-off clamp with the pipeline at a position below the one or more tensioners,
  transferring the weight of the seagoing pipeline onto the hang-off clamp and holding the seagoing pipeline in the firing line by means of the hang-off clamp,
  severing the pipeline between the hang-off clamp and the one or more tensioners,
  connecting an auxiliary tensioning device to the lower end of the pipeline held by the one or more tensioners,
  transferring pipeline tension from the one or more tensioners onto the auxiliary tensioning device,
  releasing the one or more tensioners from the pipeline, so that a section of the pipeline is held in the firing line between the pipeline diverter and the auxiliary tensioning device,
  vacating the firing line by at least displacing both the pipeline diverter and the auxiliary tensioning device and thereby displacing said section of the pipeline from the firing line,
  arranging the A&R cable in the firing line vacated by said section of the pipeline,
  connecting the A&R cable to the upper end of the seagoing pipeline held by the hang-off clamp in the firing line,
  transferring the weight of the seagoing pipeline from the hang-off clamp onto the A&R cable,
  releasing the hang-off clamp from the seagoing pipeline,
  operating the A&R winch and thereby lowering the pipeline onto the seabed.

The inventive method thus envisages that the firing line is vacated or cleared by shifting the pipeline section that was originally held in the firing line by the one or more tensioners away from the firing line after this section has been severed from the seagoing pipeline that remains held in the firing line by the hang-off clamp. This shifting of the pipeline section, e.g. closer towards the tower, is done whilst keeping said pipeline section under tension by the auxiliary tensioning device that is distinct from the one or more tensioners used for the pipelaying process and that is made to engage on this pipeline section below the tracks of at least one of the tensioners, preferably below the lowermost tensioner.

Preferably the auxiliary tensioning device is adapted to provide a control of the tension that is applied to this pipeline section, e.g. such as to allow for this pipeline section to remain tensioned at a constant tension. For example the auxiliary tensioning device includes a winch and/or one or more actuators, e.g. hydraulic actuators, adapted to provide a control of the tension applied to the pipeline section.

In an embodiment the auxiliary tensioning device comprises an auxiliary winch, an auxiliary tensioning cable, and auxiliary tensioning cable sheave, wherein the method comprises moving said auxiliary tensioning cable sheave between an active position aligned with the firing line and a retracted position remote from the firing line in order to vacate the firing line.

In a practical embodiment the auxiliary tensioning device is an initiation system for initiation of pipelaying, said initiation system comprising an initiation winch, an initiation cable, and an initiation cable sheave, wherein the method comprises moving said initiation cable sheave between an active position aligned with the firing line and a retracted position remote from the firing line in order to vacate the firing line. In this embodiment the abandonment procedure may involve:

halting the pipelaying and engaging the hang-off clamp with the pipeline at a position below the one or more tensioners, transferring the weight of the seagoing pipeline onto the hang-off clamp and holding the seagoing pipeline in the firing line by means of the hang-off clamp, severing the pipeline between the hang-off clamp and the one or more tensioners, connecting the initiation cable to the lower end of the pipeline held by the one or more tensioners, transferring pipeline tension from the one or more tensioners onto the initiation cable, releasing the one or more tensioners from the pipeline, so that a section of the pipeline is held in the firing line between the pipeline diverter and the initiation cable, vacating the firing line by at least displacing both the pipeline diverter and the initiation cable sheave and thereby displacing said section of the pipeline from the firing line, arranging the A&R cable in the firing line vacated by said section of the pipeline, connecting the A&R cable to the upper end of the seagoing pipeline held by the hang-off clamp in the firing line, transferring the weight of the seagoing pipeline from the hang-off clamp onto the A&R cable, releasing the hang-off clamp from the seagoing pipeline, operating the A&R winch and thereby lowering the pipeline onto the seabed.

The vacating of the firing line may preferably involve a simultaneous displacement of the pipeline diverter and of the auxiliary tensioning device, e.g. of the initiation cable sheave, away from the firing line. Once the firing line has been vacated, the A&R cable is arranged in the firing line and connected to the upper end of the seagoing pipeline which is still held in position by the hang-off clamp.

The shifting of this pipeline section to vacate the firing line is preferably such that this pipeline section is spaced at least 0.2 meter, e.g. at least 0.5 meter, from the firing line, possibly at least 1 meter, so as to avoid any later interference with the A&R cable (and any A&R cable connector thereon which are often quite bulky). In an embodiment wherein the tower has one or more centralizers it is envisaged that as soon as the A&R connector has passed in its decent towards the seagoing pipeline end the centralizer is closed around the A&R cable to provide guidance for said cable.

If the tower is provided with one or more retractable tensioners, the step of vacating the firing line may include the retraction of said one or more retractable tensioners. Examples of such tensioners and the retraction thereof are disclosed in WO2007/108673 which disclosure is incorporated herein by reference. In embodiments the retraction of each tensioner may substantially comprises a translation of the tensioner, e.g. into a space between two vertical leg members of the launch tower. In other embodiments the retraction may include a pivoting of the tensioner to a retracted position, e.g. about a vertical pivot axis.

In another embodiment of the inventive method, e.g. to be performed in case the one or more tensioners have a tensioner frame that is stationary fitted on the tower, it is envisaged that one or more tracks of the tensioners are moved into a retracted position within the tensioner frame, this internal retraction of one or more tracks providing sufficient clearance for the lateral shifting of this pipeline section to vacate the firing line. In another embodiment the frame of the tensioner can be folded open to achieve a retraction relative to the firing line.

In a practical embodiment the step of severing the pipeline between the hang-off clamp and the one or more tensioners is performed before the step of connecting an auxiliary tensioning device to the lower end of the pipeline held by the one or more tensioners. In particular when—in an embodiment—the pipeline is severed at two spaced apart locations, a space is created that allows for a part of the auxiliary tensioning device, e.g. a sheave, to be brought underneath the pipeline held by the one or more tensioners.

It is however also envisaged that the auxiliary tensioning device can be connected to the pipeline before the pipeline is severed. For example the pipeline can be fitted with a connector body below the one or more tensioners already ahead of the severing step, said connector body being connected to the auxiliary tensioning device and only then the pipeline being severed below the connector body fitted on the pipeline. For example the pipeline is fitted (e.g. by welding) with a yoke that two diametrically opposed yoke ends, each yoke end being connected to a cable of the auxiliary tensioning device.

In an embodiment the tower is provided with one or more centralizers, each forming an eye that can be opened and closed and that is adapted to maintain a cable or pipeline centralized in the firing line. For example at least a lower centralizer is present below the lowermost tensioner. In an embodiment the step of vacating the firing line is, if necessary, preceded by opening the eye of one or more centralizers so as to allow the displacement of the pipeline section in said vacating step. In an embodiment the eye of one or more of the centralizers is closed after the A&R cable has been pulled down along the firing line towards the upper end of the seagoing pipeline, the one or more closed centralizers maintaining the A&R cable in the firing line.

In embodiments the pipeline to be laid can be spooled from a horizontal axis storage reel or from a vertical axis carousel storage for the pipeline onboard the vessel, e.g. a carousel below deck of the vessel.

In another embodiment, for which the inventive method is particularly advantageous, the marine pipelaying vessel further comprises a horizontal pipeline assembly line with one or more welding stations, wherein the pipelaying involves welding pipes end to end to form the pipeline to be laid. The assembled pipeline is the passed directly via a pipeline feed trajectory to the pipeline diverter on the tower. Examples of such a pipelaying vessel are disclosed in U.S. Pat. No. 5,975,802.

In an embodiment hereof the pipeline assembly line has an assembly direction for the pipeline that is directed away from the tower, and the marine pipelaying vessel further comprises an assembly line diverter, e.g. a diverter wheel, that diverts the pipeline upward and to the pipeline diverter on the tower.

In an embodiment the step of vacating the firing line further comprises displacing the assembly line diverter and displacing any pipeline present in the assembly line in a manner so as to maintain a constant distance between the assembly line diverter and the pipeline diverter on the tower. For example one or more welding stations of the pipeline assembly line are mounted displaceable on the vessel so as to allow for their displacement simultaneous with the assembly line diverter, e.g. allowing to continue welding and/or coating of the welded areas, or other activities performed on the pipeline whilst this displacement takes place. This further reduces the impact of the abandonment procedure as one can now finish the end-to-end assembly even while the abandonment procedure is ongoing.

In an embodiment the assembly line comprises an assembly line tensioner engaging on the pipeline near the end of the assembly line allowing to tension the pipeline between said assembly line tensioner and the one or more tensioners on the tower during pipelaying and between said assembly line tensioner and the initiation cable in the course of the abandonment of the pipeline.

In an embodiment the invention envisages that an auxiliary tensioning cable sheave, that is arranged below the lowermost tensioner and that is movable between an active position aligned with the firing line and a retracted position remote from the firing line in order to vacate the firing line as disclosed herein above, may also be used in an alternative A&R procedure wherein this sheave acts as an A&R cable suspension sheave of a second A&R system of the installation, e.g. the second A&R system having a lower A&R load and/or lesser A&R depth capacity than the first system that includes the A&R cable suspension sheave arranged above the uppermost tensioner.

The present invention also relates to a marine pipelaying installation to be mounted or mounted on a vessel for laying a pipeline on the seabed according to claim 13, which vessel may be of use for the method of any of claims 1-12. In this installation the pipeline diverter is displaceable mounted on the tower and a pipeline diverter displacement actuator is provided which is adapted to displace the pipeline diverter between an active position wherein a pipeline passing over the pipeline diverter exits said pipeline diverter in the firing line and a retracted position wherein the pipeline diverter is remote from the firing line. It will be appreciated that this retraction motion may involve in some embodiments the entire diverter, e.g. embodied as a semi-circular diverter or as a circular wheel, or may in other embodiments involve motion of a portion of the diverter, e.g. of an exit portion near the firing line. In this installation further an auxiliary tensioning device is displaceable mounted, preferably on the tower, and an auxiliary tensioning device displacement actuator is provided allowing to displace the auxiliary tensioning device between an active position aligned with the firing line and a retracted position remote from the firing line. The installation further comprises a controller that is adapted to control the operation of at least the pipeline diverter displacement actuator and the auxiliary tensioning device displacement actuator.

For example the controller is a computerized controller, preferably operated from a control room of the vessel. This controller is adapted to provide retraction signals on the basis of which the pipeline diverter displacement actuator and the auxiliary tensioning device displacement actuator perform a retraction that vacates a pipeline section held between the auxiliary tensioning device and the pipeline diverter from the firing line. This installation allows to perform the inventive method.

In an embodiment the auxiliary tensioning device comprises an auxiliary winch, an auxiliary tensioning cable, and auxiliary tensioning cable sheave, wherein the auxiliary tensioning cable sheave is movable between an active position aligned with the firing line and a retracted position remote from the firing line in order to vacate the firing line.

In a practical embodiment the auxiliary tensioning device is an initiation system for initiation of pipelaying, said initiation system comprising an initiation winch, an initiation cable, and an initiation cable sheave, wherein the initiation cable sheave is movable between an active position aligned with the firing line and a retracted position remote from the firing line in order to vacate the firing line. Preferably this sheave is directly mounted in a mobile manner on the tower, e.g. on a mobile, e.g. pivotal, arm connected to the tower. An initiation cable sheave displacement actuator is provided that is adapted to displace the initiation cable sheave between an active position aligned with the firing line and a retracted position remote from the firing line, e.g. closer to the tower.

In an embodiment the installation further comprises a horizontal pipeline assembly line with one or more welding stations allowing to weld pipes end to end to form the pipeline to be laid during pipelaying, the pipeline passing from the assembly line directly via a pipeline feed trajectory to the pipeline diverter on the tower. In a version thereof the pipeline assembly line has an assembly direction for the pipeline that is directed away from the tower, wherein the installation further comprises an assembly line diverter that diverts the pipeline upward and to the pipeline diverter on the tower. In a further development thereof the assembly line diverter is displaceable, wherein an assembly line diverter actuator is provided to displace the assembly line diverter, and wherein the controller is adapted to provide a retraction signal on the basis of which the assembly line diverter actuator performs a retraction in unison with the retraction of the pipeline diverter and of the initiation cable sheave allowing to maintain a constant distance between the assembly line diverter and the pipeline diverter on the tower during the step of vacating the firing line.

In a practical embodiment the tower is provided with a work platform that is vertically movable at least along a lower portion of the tower—in the area below the one or more tensioners—which work platform is accessible by personnel allowing to perform a severing of the pipeline between the one or more tensioners and the hang-off clamp.

In embodiment the A&R cable is provided with a connector, said connector being held near the A&R cable suspension sheave during pipelaying, wherein the installation further comprises a tugger system adapted to forward the A&R cable an upper end of the seagoing pipeline held by the hang-off clamp in the course of abandonment of the pipeline, said tugger system comprising:
 a tugger winch and tugger cable,
 a tugger cable sheave,
wherein—after the step of vacating the firing line—the tugger cable is passable upward from the tugger cable sheave adjacent the upper end of the seagoing pipeline along the firing line to the A&R cable connector, such that the A&R cable connector can be pulled downward towards the upper end of the seagoing pipeline and connected there to.

In embodiments the hang-off clamp is a mobile hang-off clamp that is movable between an active position in the firing line and a retracted position remote from the firing line. For example the hang-off clamp is mounted on a mobile hang-off clamp support member that is adapted to move over rails, e.g. rails extending in longitudinal direction of the vessel on opposite sides of the moonpool of the vessel. For example the support member is skidded over such rails or is provided with wheels that engage on said rails. For example the hang-off clamp is pivotally mounted on the corresponding support member so as to pivot about a horizontal axis. For example the hang-off clamp support member is embodied as a hatch cover, e.g. a sliding hatch cover, embodied to cover at least a part of the moonpool and to provide a work floor.

In embodiments the hang-off clamp is a friction clamp.

In an embodiment the tugger cable sheave is mounted on a mobile hang-off clamp support member allowing to pull the A&R cable effectively toward the pipeline end.

The present invention also relates to a marine pipelaying vessel provided with an installation according to the invention. For example the vessel has a moonpool and for example the tower is arranged aft of the moonpool.

A second aspect of the present invention relates to a marine pipelaying installation to be mounted on a vessel for laying a pipeline on the seabed, wherein the marine pipelaying installation comprises:
  a pipeline launch tower,
  a pipeline diverter which is supported at an elevated position on the tower,
  one or more tensioners supported by the tower below the pipeline diverter and adapted to lower a pipeline to be installed on the seabed along a firing line,
  a first A & R system for abandonment and recovery of a pipeline, said first A&R system comprising:
    a first A&R winch and first A&R cable,
    a first A&R cable suspension sheave that is arranged on the tower at the level of the pipeline diverter or there above and that is or can be brought in alignment with the firing line to lower the first A&R cable there along,
  a hang-off clamp,
wherein the vessel further comprises an initiation system for initiation of pipelaying, said initiation system comprising an initiation winch, an initiation cable, and an initiation cable sheave, wherein the initiation cable sheave is movable between one or more active positions and a retracted position, wherein said one or more active position comprise:
  a first active position wherein the initiation cable departs from the initiation cable sheave upwards in the firing line or wherein a second A&R cable, e.g. formed by the initiation cable, departs a single fall A&R cable downwards from the initiation cable sheave in downwards direction along the firing line,
  a second active position wherein a second A&R cable, e.g. formed by the initiation cable, departs from this sheave downwards in a double fall A&R cable arrangement along the firing line.

It will be appreciated that the initiation cable sheave in this installation according to the second aspect of the invention may advantageously be used in a less demanding A&R procedure, e.g. with the second A&R system having a lower A&R load capacity and/or a reduced A&R depth capacity compared to the first or main A&R system. In an embodiment the second A&R system is effectively formed by the initiation system, so with the initiation cable winch as second A&R winch and with the initiation cable as second A&R cable, yet with another routing of the cable over the relevant sheave, namely downward instead of upward.

Preferably one or more mechanical locking devices are provided to secure the initiation cable sheave in one or more active positions and preferably also in retracted position, e.g. the cable sheave being supported by a pivotal arm that is connected to the tower via a bracket, e.g. one or more locking openings and at least one locking pin being provided to mechanically lock the arm in the one or more positions.

A third aspect of the present invention relates to a marine pipelaying installation to be mounted on a vessel for laying a pipeline on the seabed, wherein the marine pipelaying installation comprises:
  a pipeline launch tower,
  a pipeline diverter which is supported at an elevated position on the tower,
  one or more tensioners supported by the tower below the pipeline diverter and adapted to lower a pipeline to be installed on the seabed along a firing line,
  at least one straightener track mounted on a straightener track frame that is movable mounted on the tower so that the straightener track is movable between an active position engaging on the pipeline departing from the diverter and a retracted position closer to the tower away from the firing line,
wherein the installation further comprises a pipeline retention clamp having a mobile clamp body with a friction face adapted to frictionally engage on the pipeline opposite from the straightener track, so that—with the track being held stationary—the pipeline is immobile.

The invention also relates to the use of an installation according to the third aspect of the invention, wherein the pipeline retention clamp is used to retain the pipeline extending over the pipeline diverter, e.g. with the pipeline section originally held by the one or more tensioners being entirely removed.

It will be appreciated that the aspects of the invention may be employed in various combinations.

The invention will now be explained in more detail with reference to the appended drawings.

DETAILED DESCRIPTION OF EMBODIMENTS

Figure 1:
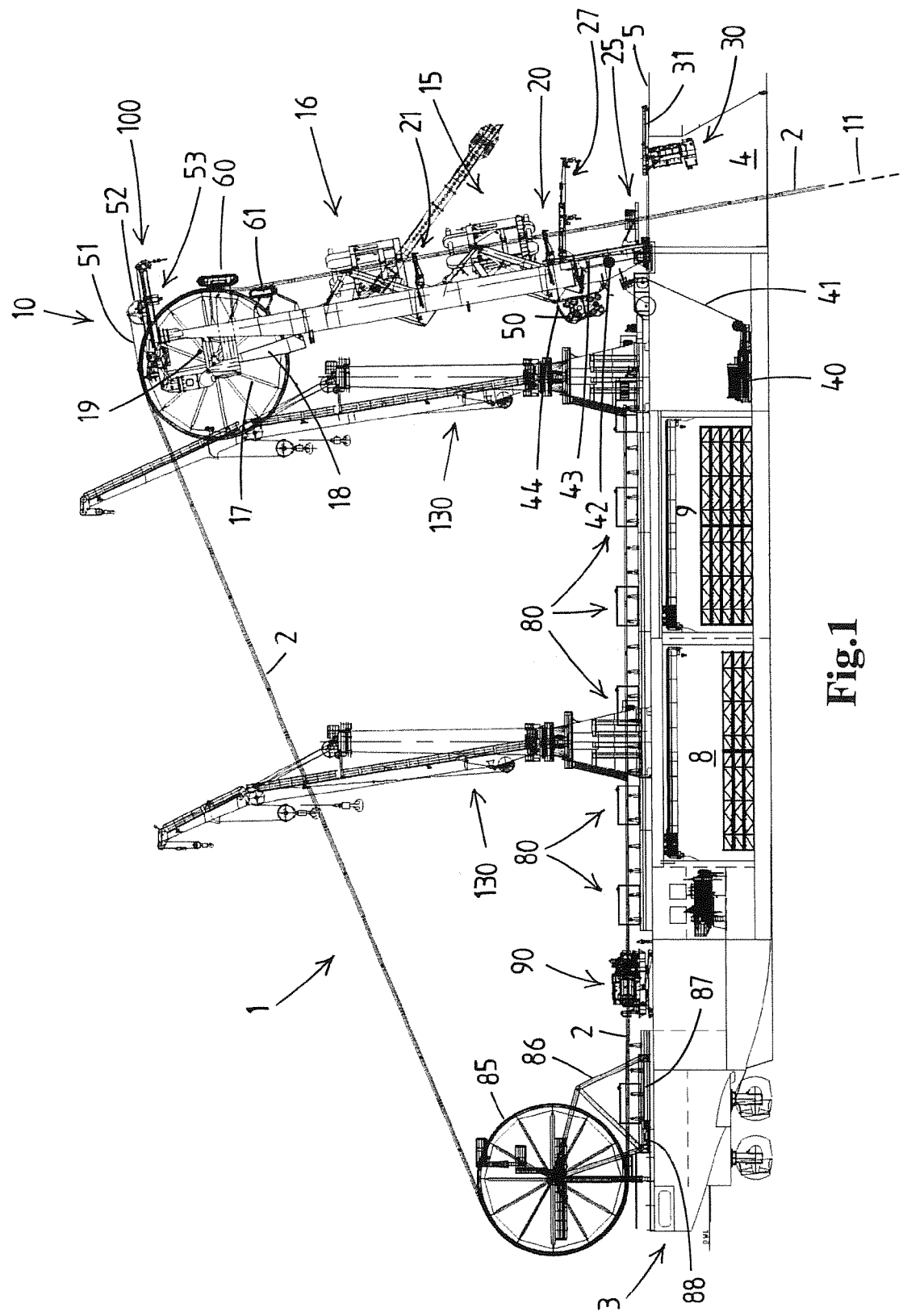
FIG. 1 shows schematically in longitudinal cross-section a portion of a marine pipelaying vessel provided with an embodiment of an installation according to the invention.

In FIG. 1 a marine pipelaying vessel 1 provided with an embodiment of an installation according to the invention is shown. The installation allows to install a pipeline 2 on the seabed, e.g. a pipeline for hydrocarbons, such as gas or oil.

The pipelaying vessel 1 has a hull, here a monohull 3, which is provided with a moonpool 4 extending through the hull between a deck 5 adjacent the moonpool 4 and the hull bottom. A pipeline launch tower 10 is arranged aft of the moonpool 4. In an alternative embodiment the vessel has a semi-submersible hull with one or more pontoons and columns that support a deckbox at a distance above the one or more pontoons. On the deckbox the pipelaying installation is mounted, e.g. with a moonpool through the deckbox.

For example, as here, a bridge and accommodation topside is arranged on the hull 3 forward of the moonpool 4.

The tower 10 is, as is preferred, pivotally connected at a lower end thereof about a horizontal axis to the hull 3 so that the tower 10 can be placed in various inclinations, preferably including a vertical position and an inclined position, here inclining rearward to the stern of the vessel. This inclination allows to align the tower 10 with a desired inclination of a firing line 11 extending along the tower 10. The pipeline 2 passes along this firing line into the sea via the moonpool 4. In an alternative the tower 10 is not pivotal, e.g. arranged in fixed vertical orientation.

The tower 10 is provided with one or more pipeline tensioners 15, 16, here two tensioners above one another along the height of the tower 10. As is known in the art, and as preferred, each tensioner comprises multiple track units each including a track engaging on the pipeline 2 and embodied to support the weight of the pipeline 2 that is passed or launched into the sea.

In this example, and as preferred, each of the tensioners 15, 16 comprises a tensioner frame and multiple tracks supported by the tensioner frame, which tracks engaging on the pipeline during pipelaying.

At an elevated position, above the one or more tensioners 15, 16, the tower 10 is provided with a pipeline diverter 17. Here, the diverter 17 is embodied as a wheel that is rotatable about a horizontal axis. The pipeline 2 to be laid passes from a source, as will be discussed in more detail below, over the wheel 17 into firing line 11.

Each tensioner 15, 16 may be embodied to support a pipeline weight of at least 100 tons, e.g. between 150 and 450 tons. For example the tensioner 15 is embodied to support 400 mt and the tensioner 16 to support 170 mt.

The wheel 17 is supported via an intermediate mobile support structure 18 on the main structure of the tower 10 so that the wheel 17 is displaceable, here in longitudinal direction of the vessel, between an operative position wherein the pipeline exits the wheel 17 at or near the firing line 11 and a retracted position wherein the wheel 17 is spaced or remote from the firing line. A pipeline diverter displacement actuator is provided, here comprising one or more hydraulic actuators 19 between the intermediate mobile support structure 18 and the main structure of the tower 10 to displace the wheel 7.

In this example, and as preferred, each tensioner frame is displaceable mounted on the tower 10, here by parallel linkage arms, so as to be movable between an active position wherein the tracks can engage on the pipeline 2 during pipelaying with the pipeline in the firing line 11, and a retracted, non-operative position wherein the tensioner frame is remote from the firing line 11, so that a clear envelope is present around the firing line, for example of at least one meter. For example each tensioner 15, 16 is retractable into a space between vertical leg parts of the tower 10 as is known in the art.

As illustrated here, below the lower tensioner 15 the tower is provided with a lower centralizer 20 and below the upper tensioner 16 with an upper centralizer 21. These centralizers 20, 21 are known in the art and each form an eye that can be opened and closed on command. These centralizers 20, 21 allow to maintain a cable or pipeline centralized in the firing line 11, in particular when the one or more tensioners 15, 16 are not engaging on the cable or pipeline. In an embodiment each centralizer is retractable as well, allowing to bring the entire centralizer 20, 21 in a remote position away from the firing line 11.

In an embodiment a centralizer 20, 21 is provided with two eyes, one closer to the tower and one further away, allowing to retain the retracted pipeline section in the eye closer to the tower and use the other eye—in closed condition of the centralizer—for guidance of the A&R cable.

The lower tensioner 15 is arranged on the tower 10 at a position spaced above the deck 5, e.g. at least 5 meters, e.g. at least 10 meters, above the deck 5.

The tower is provided with a work platform 25 that is vertically movable along a lower portion of the tower—below the one or more tensioners 15, 16—which work platform is accessible by personnel involved in the abandonment procedure as will explained below.

The tower 10 here is also provided with an auxiliary crane 27 having an operative reach in the region below the lower tensioner 15, for example a telescopic arm crane or a crane having an overhead beam and travelling winch unit, wherein the beam can be pivoted in a horizontal plane relative to the tower. This crane 27 could also be arranged directly on the vessel hull or be embodied as a mobile crane that travels over the deck of the vessel and is brought into position in this region when required.

The vessel is provided with a hang-off clamp 30, here arranged within the moonpool 4 as is preferred, which is adapted to support the entire weight of the seagoing pipeline. The clamp 30 may for example be a friction clamp and/or a collar clamp.

As illustrated here the hang-off clamp 30 is arranged on a hang-off clamp carrier 31 in a mobile manner so as to be movable between an active position in the firing line 11 and a retracted position remote from the firing line 11. During pipelaying by means of the tensioners 15, 16 the hang-off clamp is in the remote position thereof. In the embodiment shown here the carrier 31 is embodied as a sliding moonpool hatch cover allowing to cover a portion of the moonpool and at the same time providing a work floor for personnel when arranged over the moonpool.

The hang-off clamp 30 is pivotally supported on the carrier 31 to allow for alignment of the clamp 30 with the actual firing line 11.

The vessel further comprises an initiation system for initiation of the pipelaying. This initiation system comprises an initiation winch 40 here arranged below deck. The winch 40 controls an initiation cable 41 that extends, via one or more intermediate sheaves, to an initiation cable sheave 42 that is mounted on the tower 10 in a mobile manner. The winch 40 may have a capacity of more than 40 tons, here (as an example) of 125 tons.

In the example shown here the sheave 42 is mounted on a pivotal arm 43 that is pivotally connected to the tower 10. The arm 43 is pivoted, here about a horizontal axis, by means of an pivotal arm actuator, here a hydraulic actuator 44, so as to move between a retracted position generally close to the main structure of the tower 10 and a firing line position wherein the cable 41 exists—in upward direction—the sheave 42 in the firing line 11.

The vessel is further provided with an A & R system for abandonment and recovery of a pipeline 2. This A&R system comprises an A&R winch 50 and A&R cable 51. In this example the winch 50 includes a traction winch that is arranged on the tower 10 whereas a storage winch is arranged below deck in the hull. In alternative embodiments the entire A&R winch 50 is arranged on or within the hull of the vessel. The cable 51 passes from the winch 50 via one or more intermediate sheaves to A&R cable suspension sheave 52 from which the A&R cable 51 departs into the firing line 11 in an abandonment procedure.

As illustrated here the A&R sheave 52 is mounted at a position above the uppermost tensioner 16, here, as is preferred, at the level of the top portion of the pipeline diverter 7. As illustrated here, the A&R sheave 52 can be supported from an A&R cantilever beam 54 that extends from a top end of the tower main structure.

The A&R cable 51 is provided with a connector 53, which connector 53 is held near the A&R cable suspension sheave 52 during pipelaying, e.g. with the beam having a catcher for said connector 53.

As the pipeline to be installed in this example is a rigid pipeline 2 that is subjected to plastic deformation as it passes over the pipeline diverter 7, the tower 10 is further provided with a straightener assembly, here including a first straightener track 60 and a second straightener track 61.

The vessel further comprises a tugger system adapted to pull the A&R cable 51 from its non-operative mode with the connector 53 near the sheave 52 down to the upper end of the seagoing pipeline 2 held by the clamp 30 in a manner as is generally known in the art. This tugger system comprises a tugger winch 70 and tugger cable 71. A tugger cable sheave 72 is provided from which the tugger cable 71 passes upwards towards the A&R cable sheave. For clarity parts of this tugger system are only shown in the figures when their operation is discussed.

As indicated in the introductory part the invention is compatible with different pipelaying techniques and with different sources of the pipe to be laid. In the example shown here the pipeline 2 is manufactured onboard in a horizontal pipeline assembly line with one or more welding stations 80, and possible one or more of a coating station, NDT inspection station, etc. for the welds. The pipeline assembly then involves welding pipes end to end to form the pipeline 2 to be laid. This pipeline 2 is, in this example, not stored on a storage reel but is passed directly via a pipeline feed trajectory to the pipeline diverter 17 on the tower.

As can be seen the pipeline assembly line has an assembly direction for the pipeline 2 that is directed away from the tower 10. The vessel further comprises an assembly line diverter 85 that diverts the assembled pipeline upward and to the pipeline diverter on the tower 10. In this example the pipeline passes from the assembly line upward and then forward through a semicircular path formed by a diverter wheel 85 having a horizontal axis of rotation about a diverter support frame 86 that is in this example mounted adjacent the stern of the vessel 1. The diverter may also be embodied different than with a wheel, e.g. with a semicircular structure provided with rollers or the like.

The diverter 85 is mounted on frame 86, which frame 86 is slidable mounted on the vessel in the direction of assembly of the pipeline 2. For example the frame 86 is slidable on one or more longitudinal rails 87 on the vessel by means of an assembly line diverter actuator 88 so as to allow to displace the assembly line diverter.

The assembly line further comprises an assembly line tensioner 90 that engages on the pipeline near the end of the assembly line, ahead of the diverter 85. This tensioner 90 allows to tension the pipeline 2 between the assembly line tensioner 90 and the one or more tensioners 15, 16 on the tower 10 during pipelaying.

As is preferred, one or more stations 80 of the assembly line are mobile in direction of the assembly line, e.g. each station 80 being arranged on one or more rails, here in longitudinal direction of the vessel. This mobile arrangement of stations, such as welding stations, is known in the art from S-lay pipelaying vessels. It allows to continue operation of such a station 80 during motion of the pipeline, as the station can remain positioned relative to the connection—commonly welded connection—between pipes that make up the pipeline.

The assembly line may be exactly horizontal, but the line may also be arranged at an incline, e.g. up to an angle of 10 degrees relative to the horizontal.

The pipes to be assembled into the pipeline at the assembly line are preferably stored in holds 8, 9 in the hull of the vessel, e.g. in crates. Possibly the stored pipes are already made up from pre-assembled pipe sections to reduce the assembly activities onboard the vessel. An elevator system may be provided to lift the pipes to the level of the assembly line. The assembly line may be arranged in a building (not shown) on deck 5 of the vessel, or can be arranged below deck 5.

At the top of the tower 10 a service crane 100 is mounted, here on the structure 18. Now that the major parts of the vessel and pipelaying installation have been addressed an example of a method for installing the pipeline 2 on the seabed from the vessel 1 will be discussed. This method comprises the initiation of the pipelaying, the actual pipelaying, and the abandonment of the pipeline, e.g. due to severe weather.

The assembly of pipeline 2 is started on the assembly line. The initiation cable 41 is passed upward via the sheave 42 along the tower 10, over the diverter 17, the diverter 85 and connected to the end of the pipeline 2 in the assembly line. Upon continued assembly of the pipeline, the initiation winch 40 is employed to pull the pipeline over the diverter 85 up to and over the diverter 17, and down along the tower 10 so that the tensioners 16, 15 can be brought into engagement with the pipeline 2. Then the initiation cable 41 is detached from the pipeline 2 and the arm 43 supporting the sheave 42 is brought into its retracted position so that the sheave 42 is remote from the firing line 11. The tensioner 90 is employed to maintain a back tension in the pipeline 2 between this tensioner 90 and the tensioners 15, 16 to prevent undue sagging of the lengthy and thereby heavy section of the pipeline 2 suspended between the diverters 85 and 17.

Once the initiation is completed pipelaying is performed. The pipeline 2 is passed via the moonpool 4 into the sea and onwards towards the seabed. The angle of the tower 10 is chosen in correspondence with a desired angular orientation of the firing line 11. In some instances the tower 10 is vertical, whereas in other instances the tower is inclined (as shown e.g. in FIG. 1). The tensioners 15, 16 support the weight of the seagoing pipeline 2 during pipelaying as is known in the art. During the pipelaying the assembly of pipeline 2 at the assembly line is continued. The pipeline 2 also passes along both centralizers 20, 21, but these will have their respective eye in open position as the pipeline 2 is effectively guided by the tensioners 15, 16 in the firing line 11.

The straightener assembly, with straightener tracks 60, 61, is employed to straighten the pipeline as it departs from the wheel 17, e.g. to compensate for plastic deformation of the pipeline 2 caused by bending over the one or more diverters 17, 85.

With reference to FIGS. 2-15 now the abandonment of the pipeline 2 will be discussed in a step by step manner. The abandonment is e.g. due to severe weather wherein the pipelaying process has to discontinued.

Figure 2:
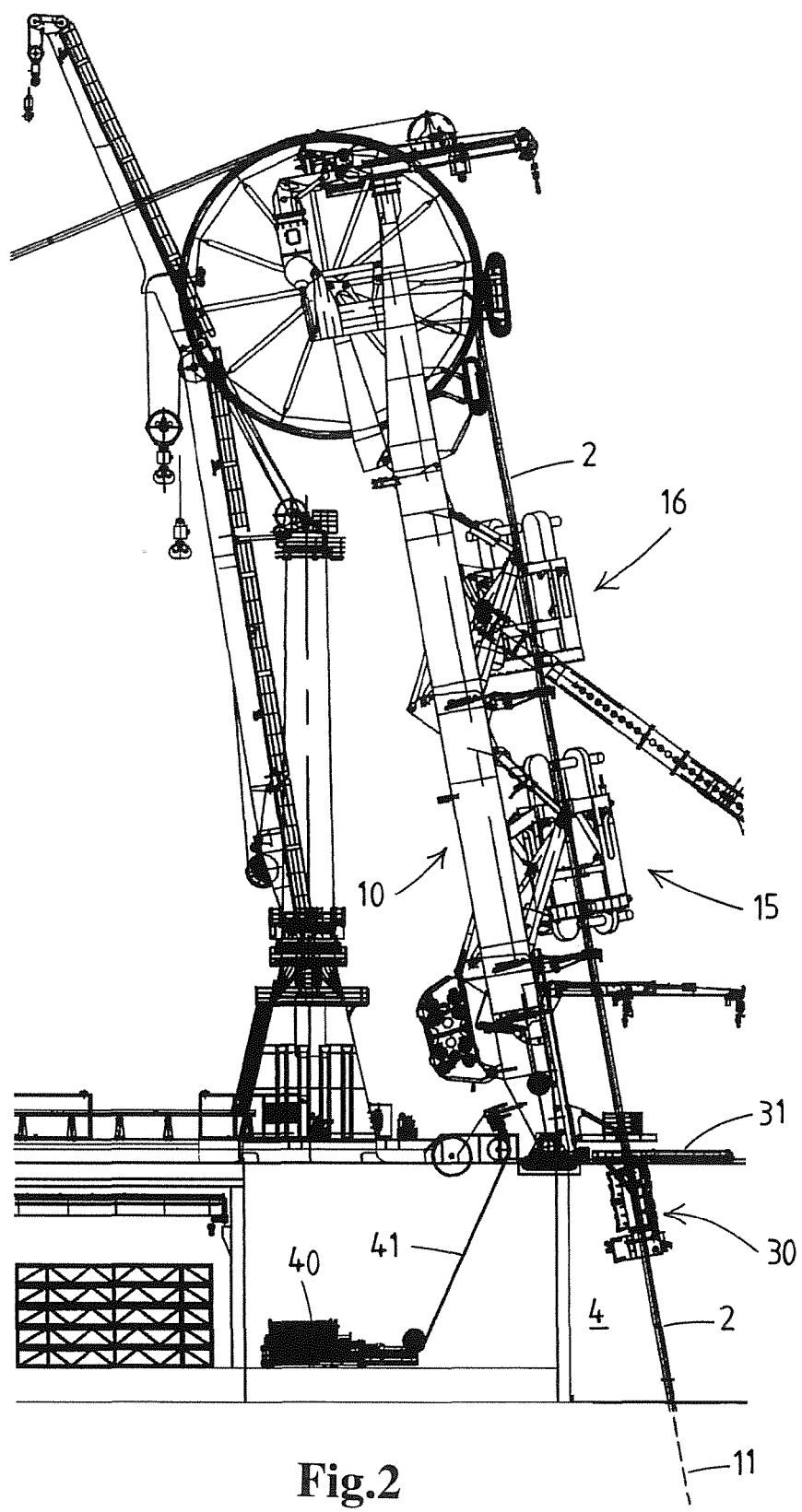
FIGS. 2-19 illustrate step by step an example of the abandonment of the pipeline in the inventive method for installing a pipeline on the seabed from the vessel of FIG. 1.

In FIG. 2 it is illustrated that the hang-off clamp 30, e.g. having a capacity of more than 500 mt, e.g. 600 mt, is brought into the firing line 11 from its remote storage position, here by skidding the hatch 31 which carries the clamp 30 over a part of the moonpool. The clamp 30 is brought around the pipeline 2 and then clamps the pipeline, e.g. with hydraulically operated friction clamp members. One the clamp 30 is properly engaged with the pipeline 2, the weight of the seagoing pipeline is transferred onto the clamp 30 by corresponding operation of the tensioners 15, 16.

Figure 3:
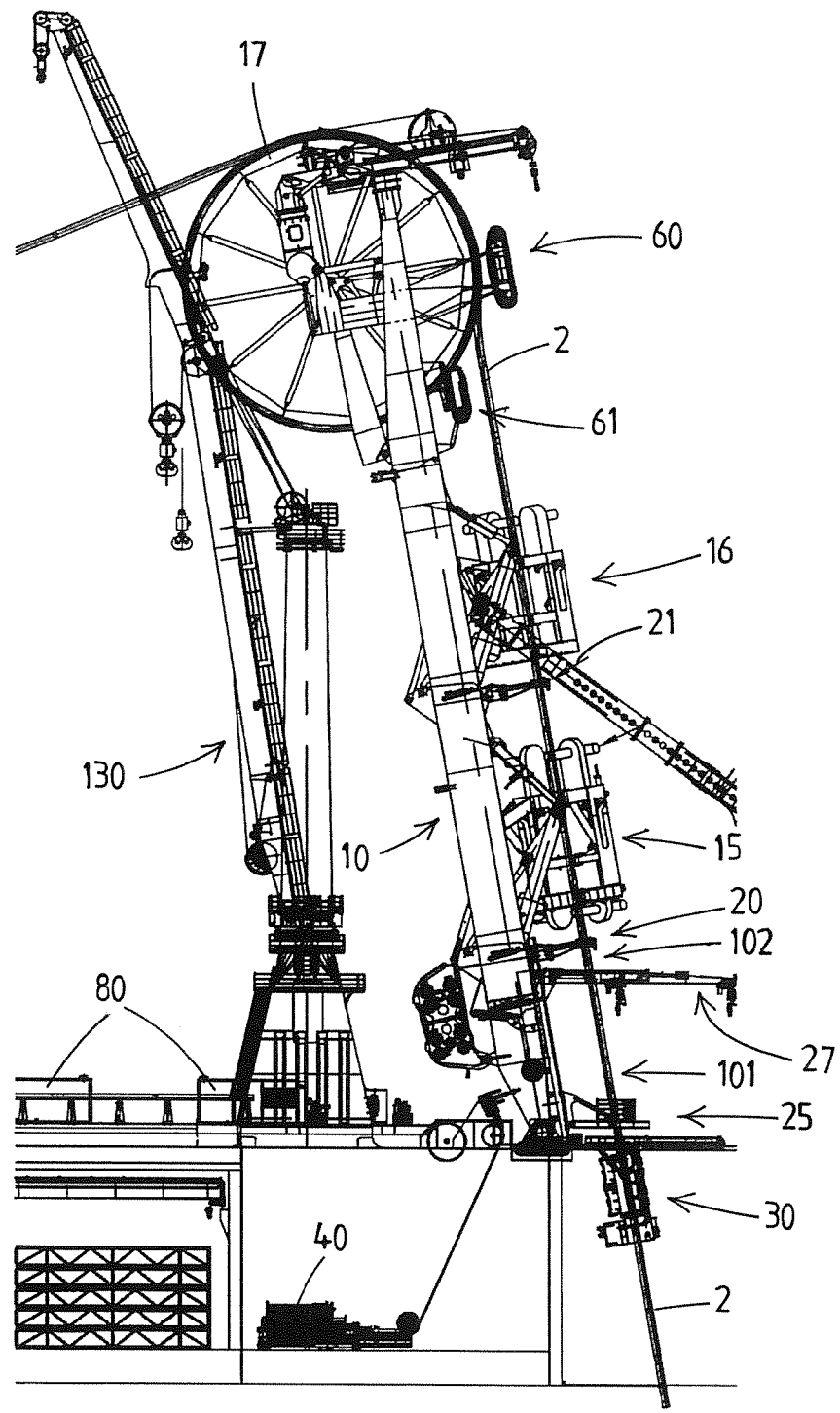

In FIG. 3 it is illustrated that the straightener assembly is brought into a retracted mode, with the tracks 60, 61 being moved away from the pipeline 2.

A first cut 101 is made through the pipeline 2 in the region between the clamp 30 and the lower centralizer 21 or the lower tensioner 15 if the centralizer where absent or not in use. This can be done by personnel standing on the platform 25 that allows said personnel to reach the pipeline 2. The platform 25 is then moved up in order to allow the making of a second cut 102 at some distance, e.g. at least 1 meter, upward from the first cut 101. In this manner a section 103 of pipeline is removed.

Figure 4:
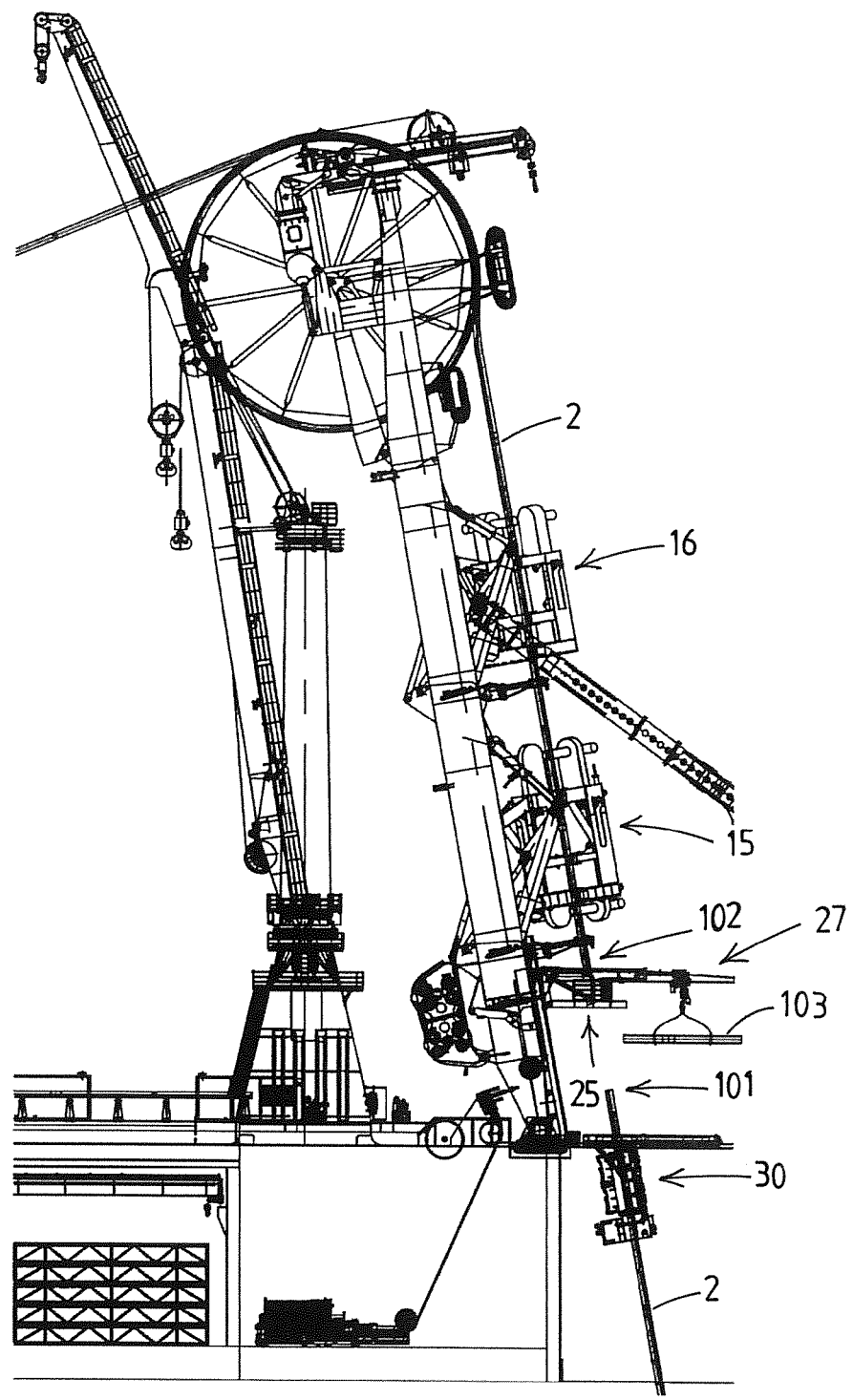

FIG. 4 illustrates the removal of pipeline section 103, wherein use is made of the crane 27 to support the section 103 during this process and to allow the removal of the section 103.

Figure 5:
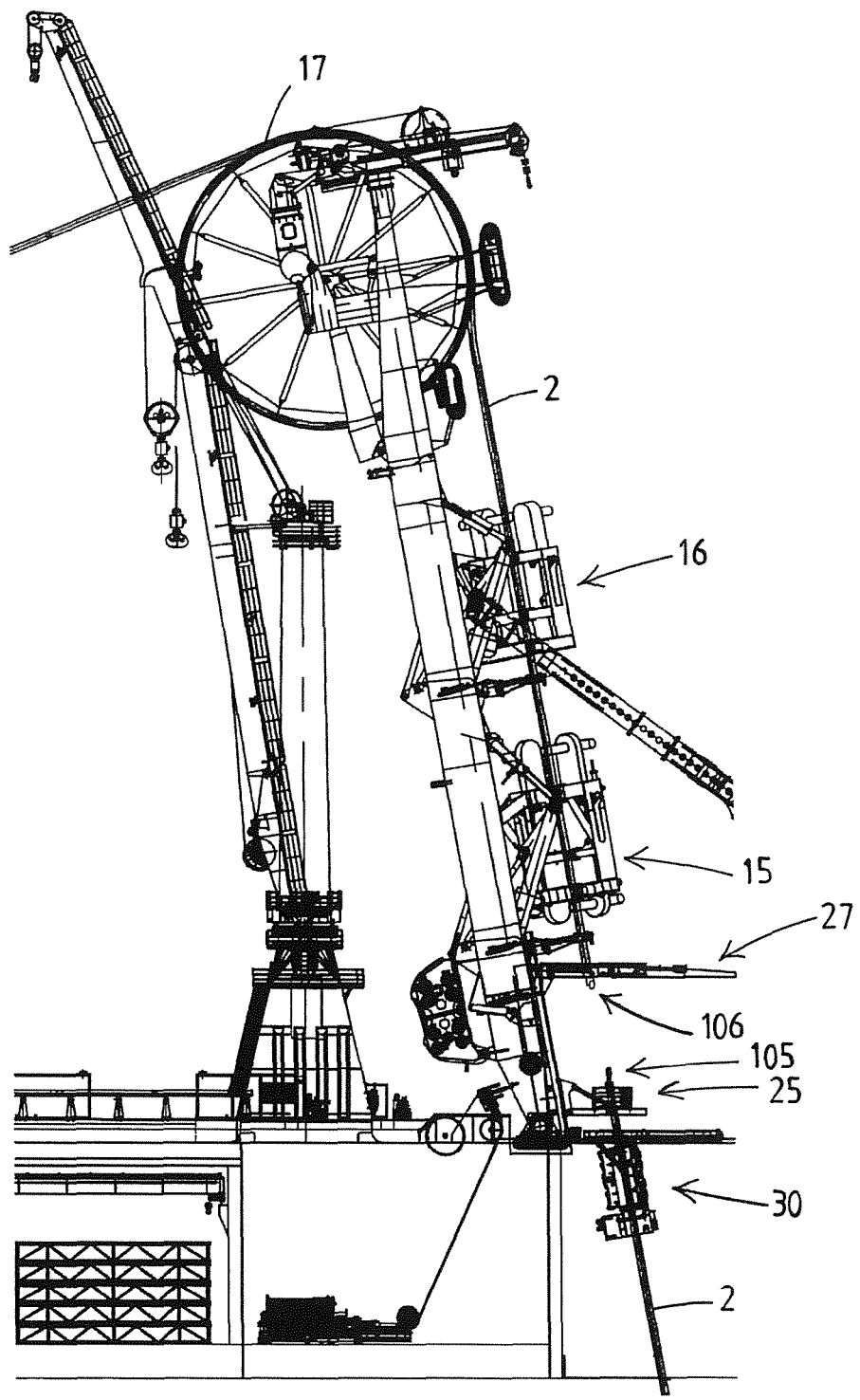

In FIG. 5 it is illustrated that an A&R head 105 is connected, e.g. welded, to the upper end of the seagoing pipeline 2, or seagoing pipeline, at the cut 101. This A&R head 105 may e.g. a capacity of 600 mt.

In FIG. 5 it is illustrated that a tensioning head 106 is connected, e.g. welded, to the lower end of the pipeline 2 still held in the tensioners 15, 16, at the cut 102. This tensioning head 106 may, e.g., have a capacity of 125 mt.

The mobile work platform 25 and the crane 27 may be employed when fitting these heads 105, 106 to the respective cut pipeline ends.

Figure 6A:
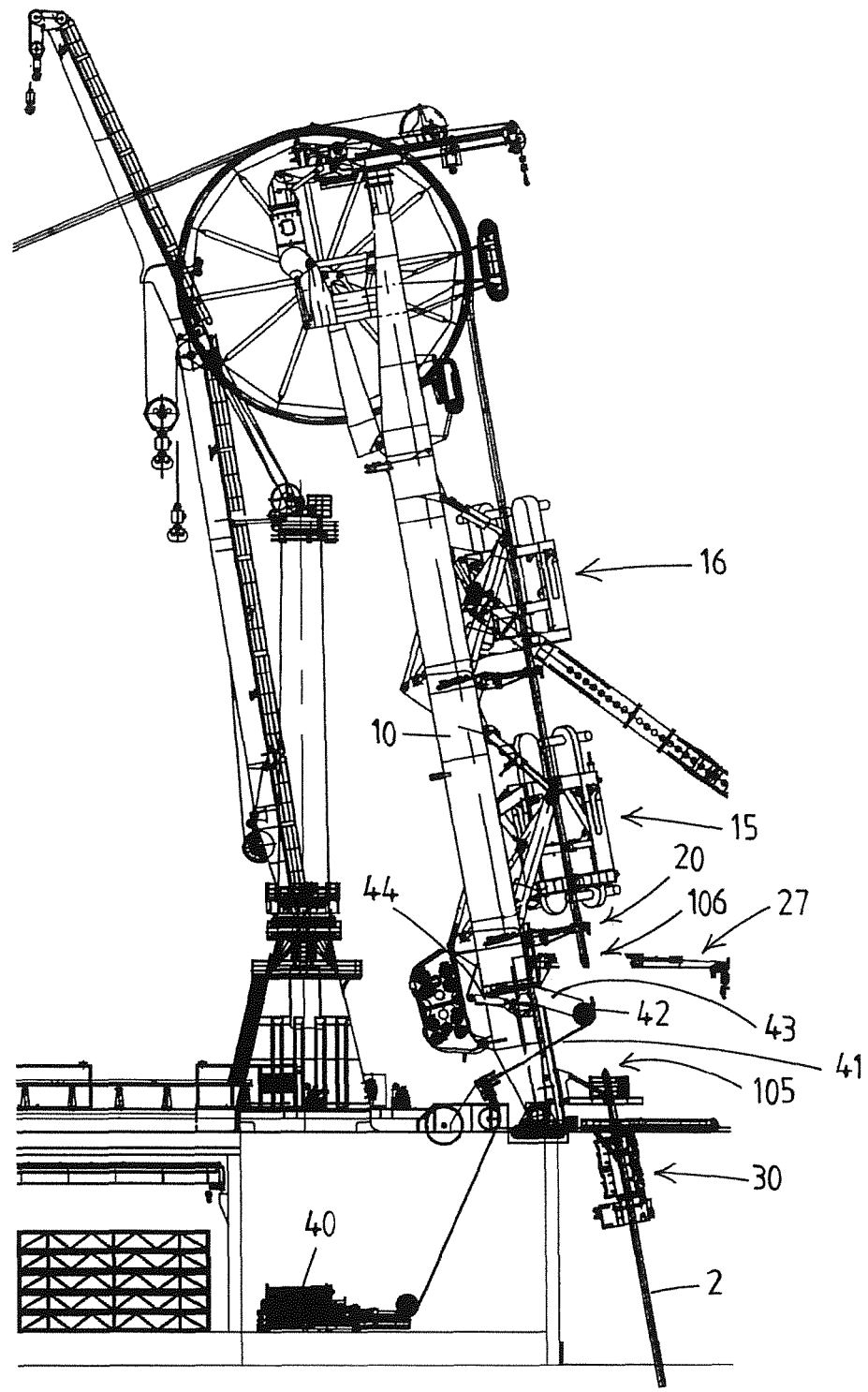
Figure 6B:
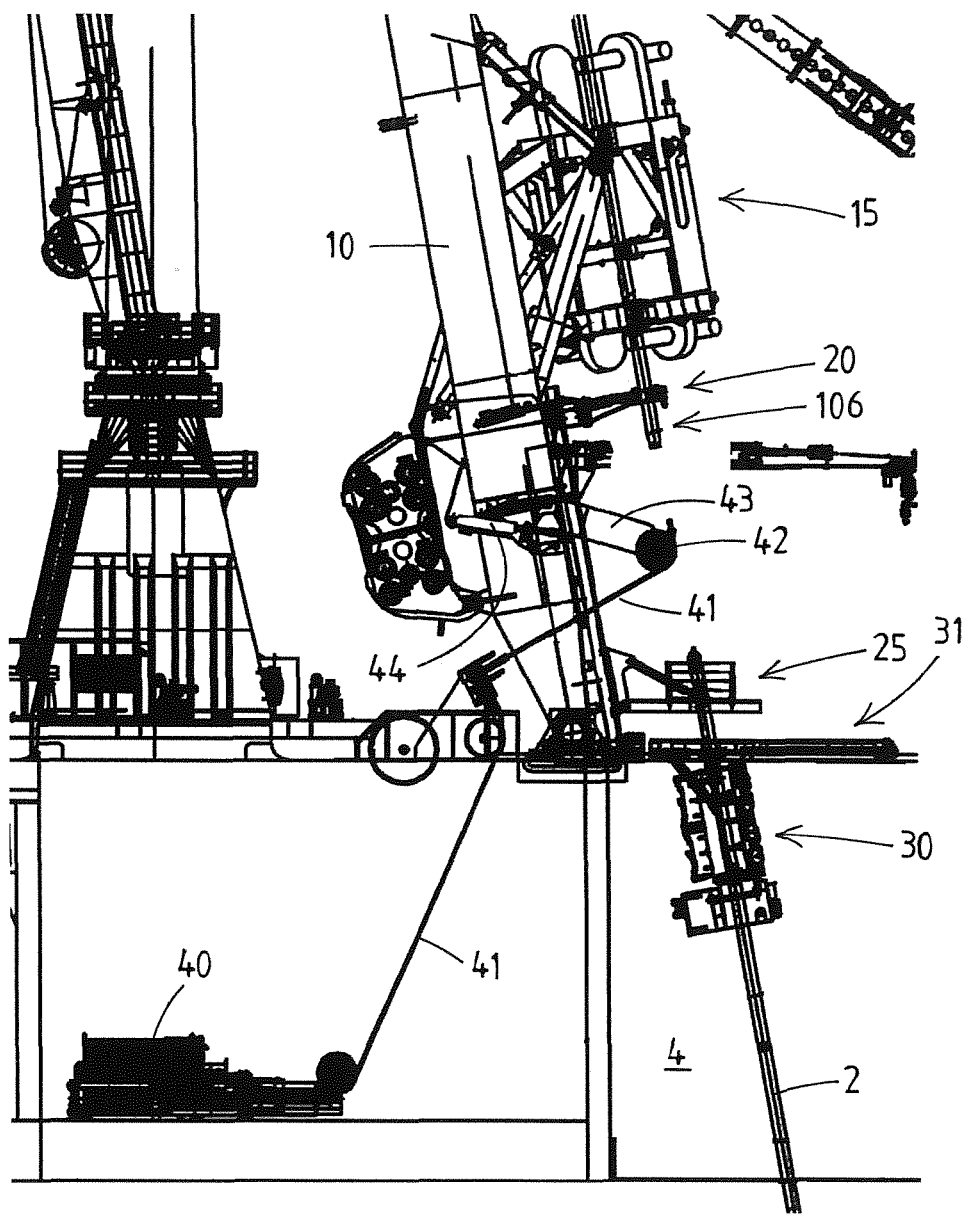

In FIGS. 6a and 6b, and some of the following figures, a part of the crane 27 has been left out for reasons of clarity.

In FIGS. 6a and 6b it is illustrated that the arm 43 and the initiation cable sheave 42 supported on said arm 43 are brought into active position, such that the initiation cable 41 can depart from the sheave 42 upwards in the firing line 11. A portion of the sheave is now in the area that is created by removal of section 103 from the pipeline 2.

The arm 43 is actuated by actuator 44, here embodied as one or more hydraulic cylinders between the arm 43 and the tower 10. The arm 43 pivots between a collapsed position generally along the height of the tower 10 and an extended position directed towards the firing line 11.

It will be appreciated that the arm 43 is of a sturdy design as the tension in the cable 41 may reach tens of tonnes, even above 100 tonnes.

Figure 7:
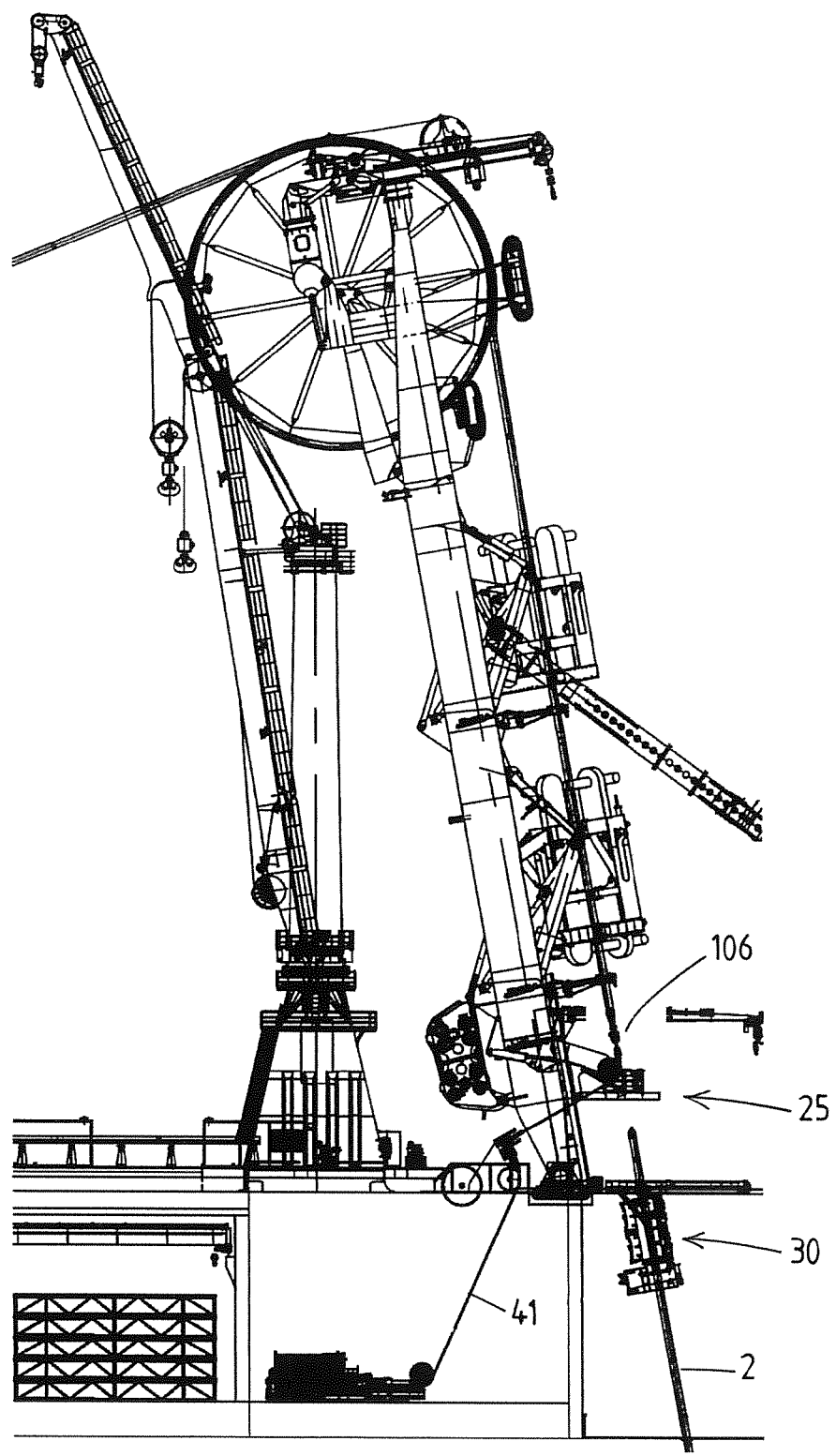

In FIG. 7 it is illustrated that the cable 41 is connected to the tensioning head 106. The mobile platform 25 allows personnel to perform this interconnection. Now that the connection is made, the winch 40 is operated to tension the cable 41 and to transfer the load of the pipeline 2 from the tensioners 15, 16 onto the cable 41 and winch 40.

Figure 8:
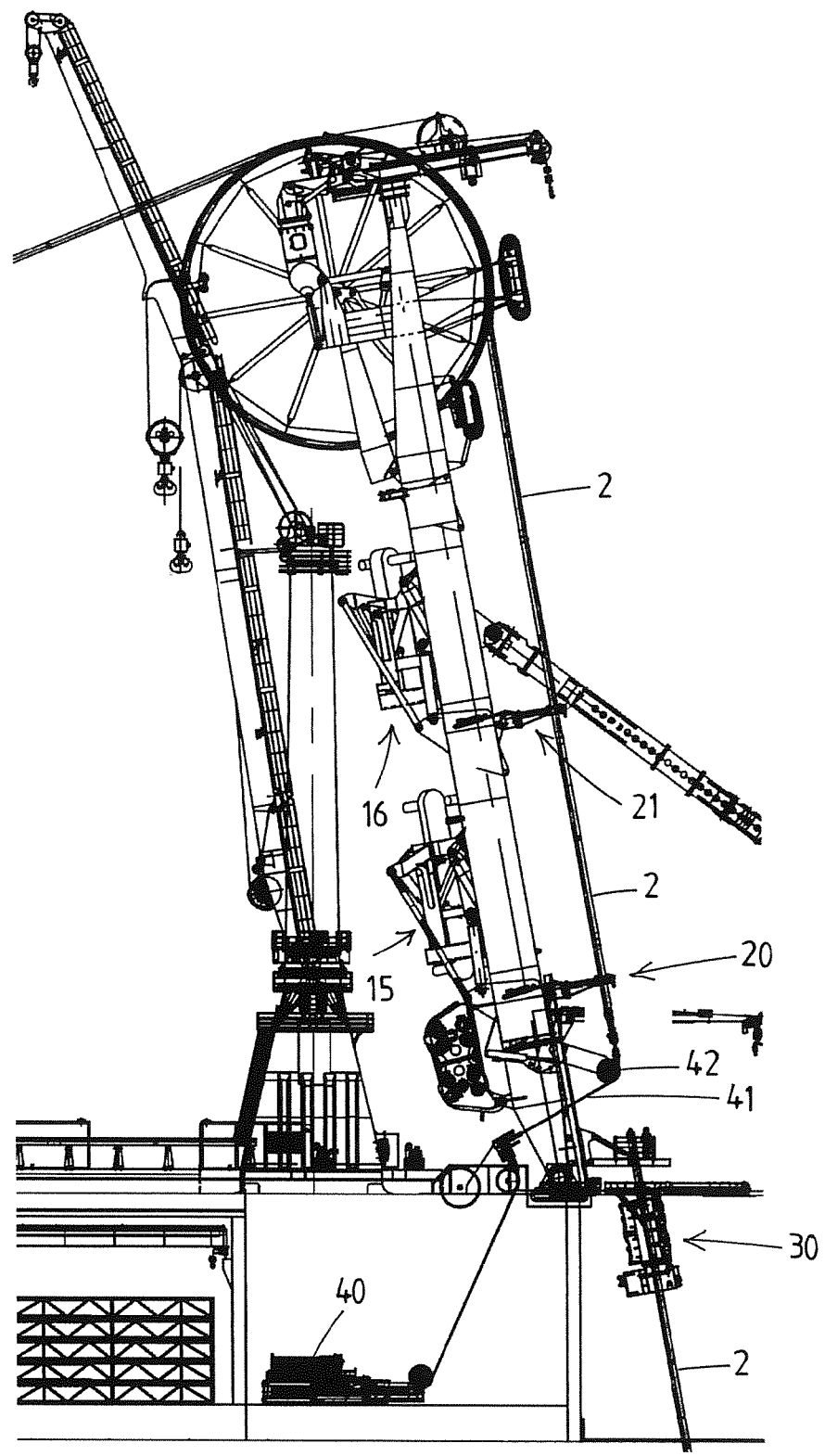

FIG. 8 illustrates that the centralizers 20, 21 have been brought into their closed position, so that the pipeline 2 passes through the closed eye of each centralizer 20, 21 and can so be held in the firing line. The tensioners 15, 16 have then been released from the pipeline 2, commonly by retracting the tensioner tracks within the frame of each tensioner. As is known in the art, the tensioners 15, 16 here allow for the opening of the frame, e.g. by having one or more doors in the frame, so that the tensioner frame can be retracted away from the pipeline. FIG. 8 illustrates the embodiment wherein a tensioner frame is received between two vertical leg parts of the tower, so that a large clear envelope is created around the section of pipeline 2 extending along the tower 10 which is still held in the firing line 11 by the centralizers 20, 21. This pipeline section is held now under tension by means of the winch 40 and cable 41, thereby avoiding any undue sagging of the pipeline 2 between the diverters 85 and 17.

Figure 9:
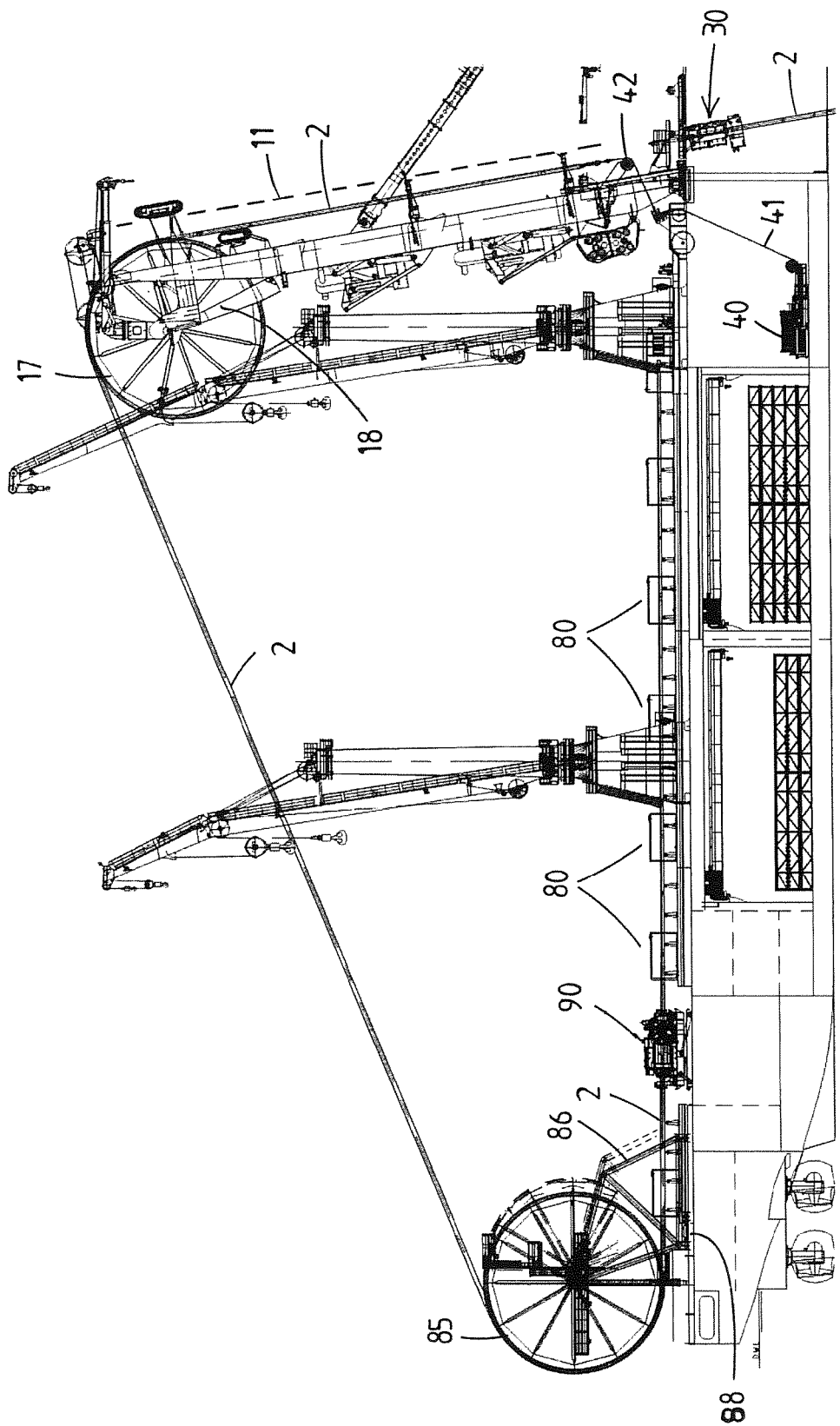

In FIG. 9 it is illustrated that the firing line 11 along the tower 10 is vacated by displacing both the pipeline diverter 17 and the initiation cable sheave 42 and thereby displacing this section of the pipeline from the firing line 11. As illustrated here the pipeline section is more or less shifted or translated in a direction closer to the tower 10. For example the distance with the firing line 11 is at least 0.5 meter, preferably at least 1 meter.

This displacement of the pipeline section extending along the tower is performed by a controller, e.g. a computerized controller loaded with software, is adapted to provide retraction signals on the basis of which the pipeline diverter displacement actuator 19 and the initiation cable sheave displacement actuator 44 perform a retraction that vacates a pipeline section held by the initiation cable 41 between the initiation cable sheave and the pipeline diverter 17 from the firing line 11. These displacements are preferably simultaneously, but one can also envisage that these displacements are non-synchronous, e.g. the diverter 17 starting ahead of the sheave 42.

FIG. 9 also illustrates that, preferably simultaneously with the above-mentioned displacements, the pipeline diverter 85 is also displaced, here towards the stern of the vessel, so as to maintain a constant length of the path between the diverter 85 and the diverter 17. This displacement is done by actuation of actuator 88 on the basis of a retraction signal from a controller. The displacement is illustrated with dashed lines in FIG. 9 representing the position of the diverter during pipelaying.

In another embodiment the diverter 85 is not or cannot be displaced as discussed above. In such a situation the pipeline will be allowed to show an increased sagging between the diverter 85 and diverter 17.

It is noted that during the A&R procedure the hang-off clamp 30 remains in the firing line 11, thereby obviating the need to displace the hang-off clamp 30 under load of the seagoing pipeline which is advantageous both with regard to the construction of the carrier 31 of the clamp 30 as well as in view of the pace at which the A&R procedure can be performed.

As indicated above, in embodiments, it is envisaged that the mobile stations 80 follow this displacement of the diverter 85. This has the advantage that any work done in the pipe assembly process at these mobile stations can continue, thereby reducing the impact of the abandonment procedure on the overall pipelaying process.

Figure 10:
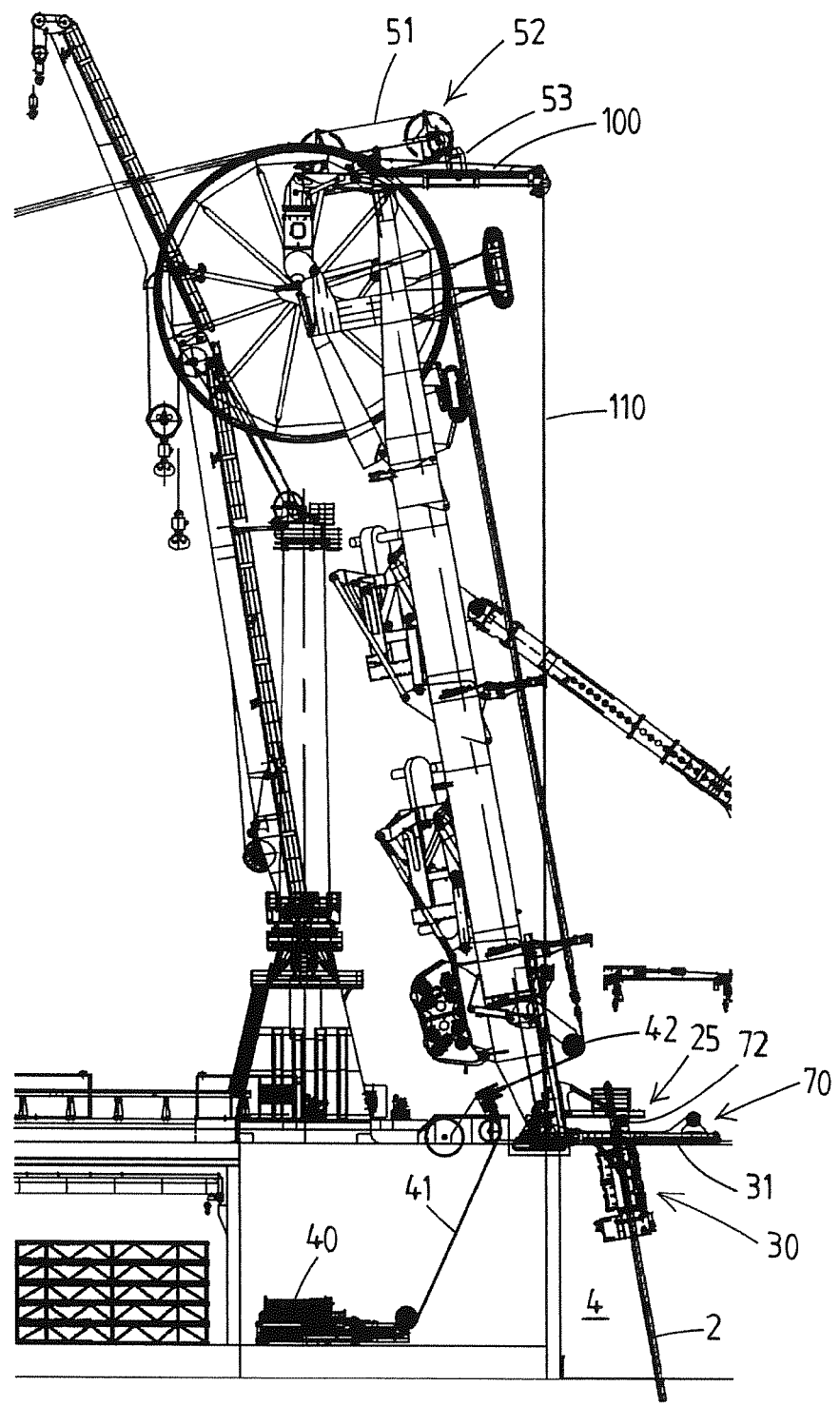

In FIG. 10 it is illustrated that the tugger winch system is being put to use in order to bring the A&R cable 51 down to the upper end of the seagoing pipeline. The service crane 100 lowers its hoisting cable 110 down to the deck region, where the tugger cable 71 is attached to the hoisting cable 110.

At this stage also the cantilever beam supporting the A&R sheave 52 is moved to align the A&R cable connector 53 with the firing line 11.

Figure 11:
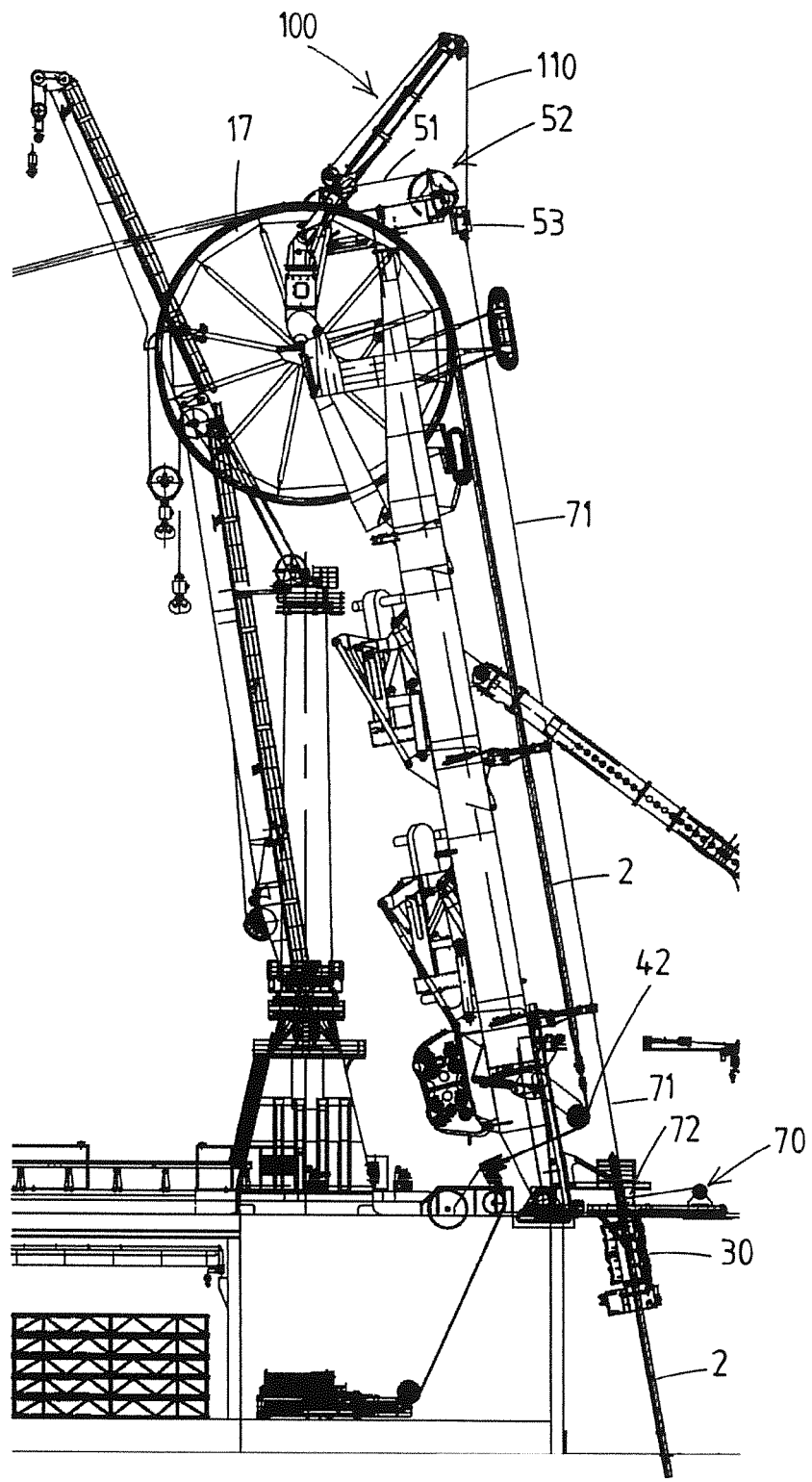

FIG. 11 illustrates that the tugger cable 71 has been raised to the connector 53 by means of crane 100 and cable 110. Then the cable 71 has been connected to the connector 53.

The A&R cable 51 is, as is common, a very strong cable, e.g. designed to carry a load of several hundreds of tonnes, e.g. a 600 mt capacity cable. This make the cable very heavy and stiff, so that the cable 51 will only move down along the tower 10 when effectively pulled down in said direction by the tugger cable 71.

Figure 12:
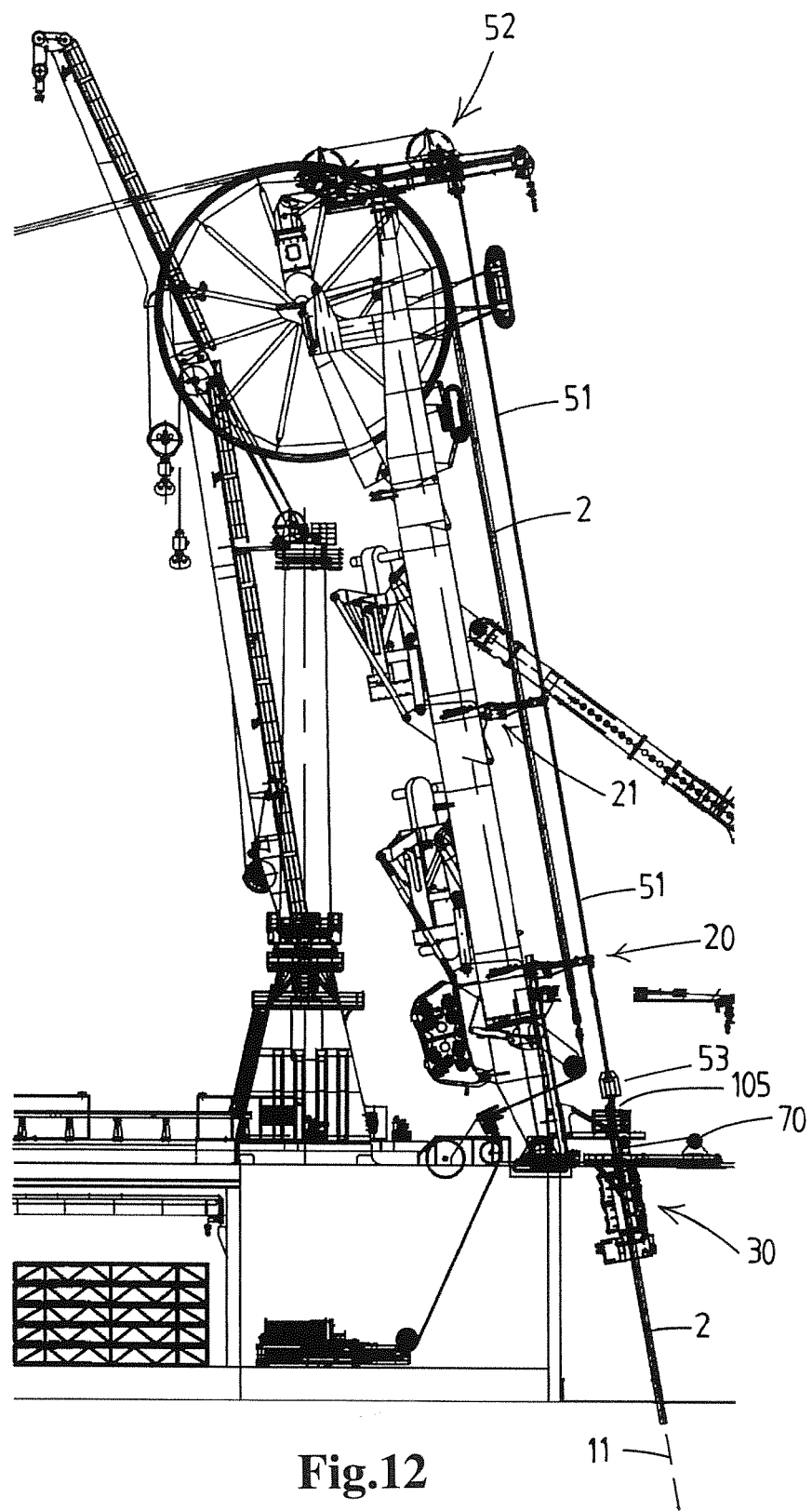

In FIG. 12 it is illustrated that the A&R connector 53 has been pulled down to the level of the A&R head 105 on the seagoing pipeline 2 and has been connected thereto. After the connector 53 has passed a centralizer 21, 20 the eye of the centralizer 21, 20 is closed around the A&R cable 51 so that the cable 51 can be held in alignment with the firing line 11. The tugger cable 71 is then disconnected.

Figure 13:
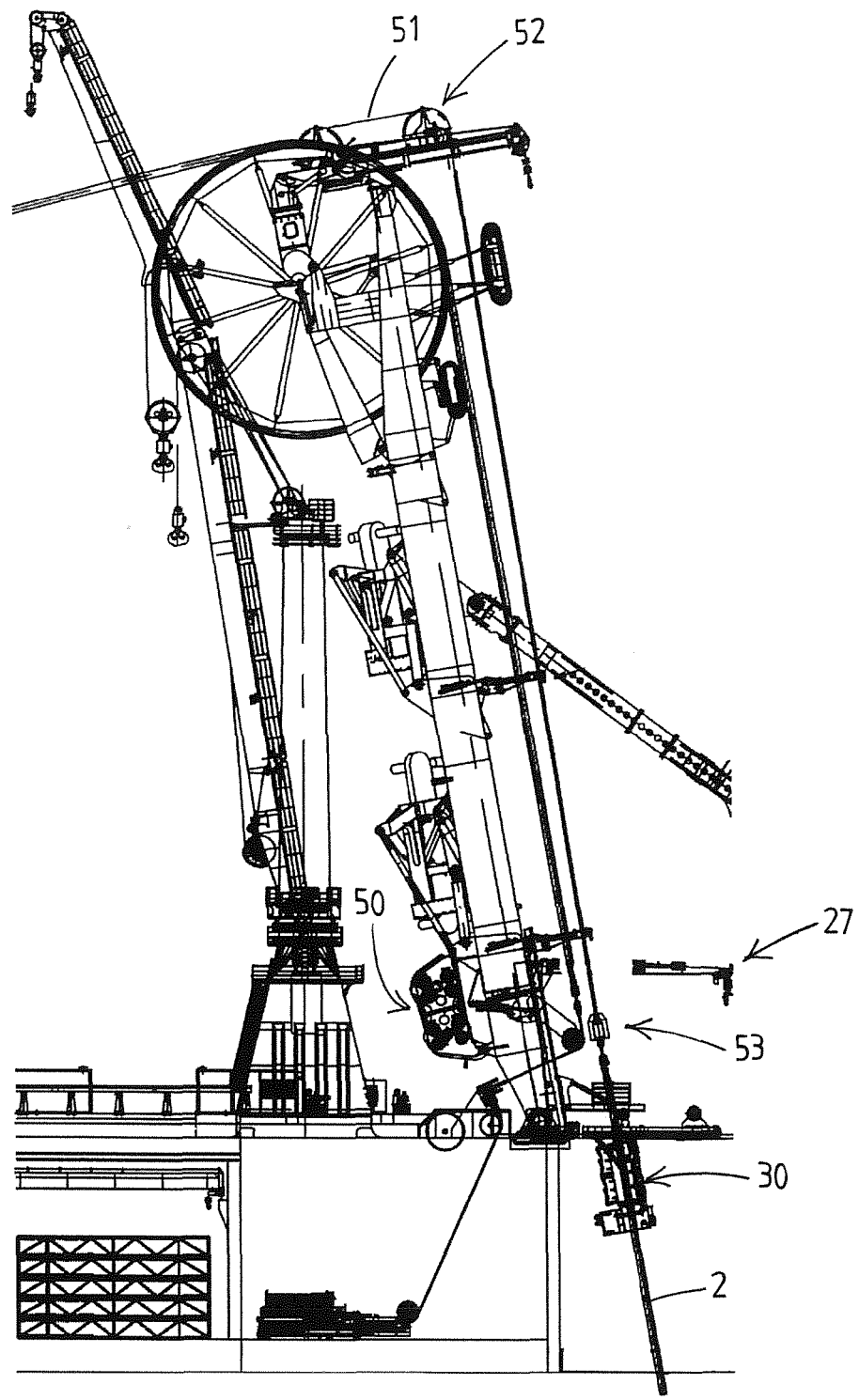

FIG. 13 illustrates that the load of the seagoing pipeline 2 is transferred from the clamp 30 onto the A&R cable 51 by operation of the A&R winch 50. This allows to release the clamp 30 from the pipeline 2.

Figure 14:
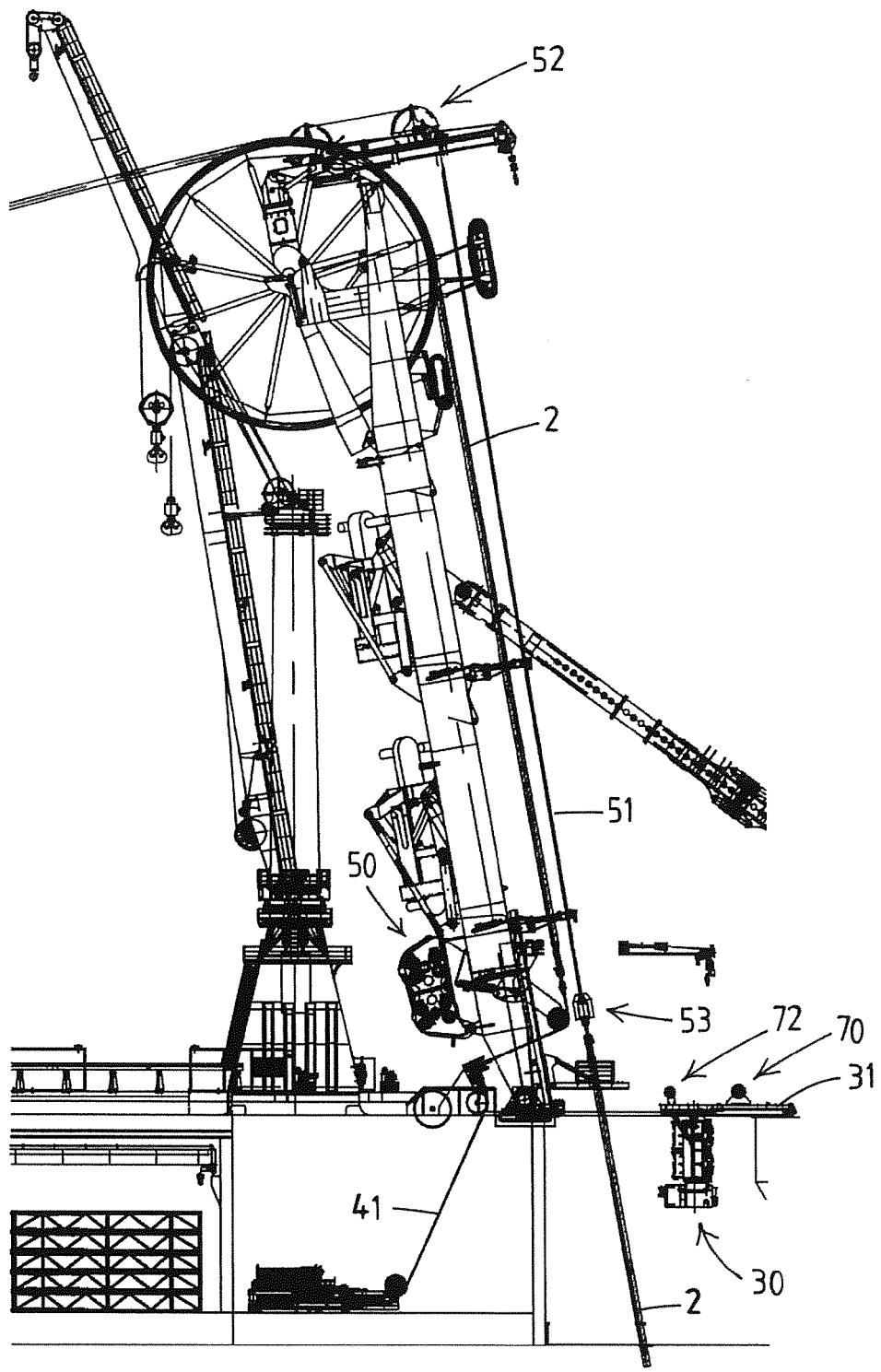

In FIG. 14 it is illustrated that the clamp 30 has been fully released from the pipeline 2 and has been moved away from the pipeline 2 into a retracted position within the moonpool 3. As can be seen the clamp 30 also has been tilted in a vertical position to demonstrate this ability of the clamp 30 to be arranged in alignment with the desired firing line inclination.

The launched or seagoing pipeline 2 is now suspended from the A&R cable 51 and by operation of the A&R winch 50 the pipeline 2 is lowered onto the seabed as part of the A&R procedure.

During this A&R procedure the pipeline section extending along the tower 10 is held under tension and away from the firing line 11 so that the cable 51 can be passed and moved along this firing line. The A&R procedure can be performed rapidly, so that optimal use can be made of the time available for pipelaying.

Figure 15:
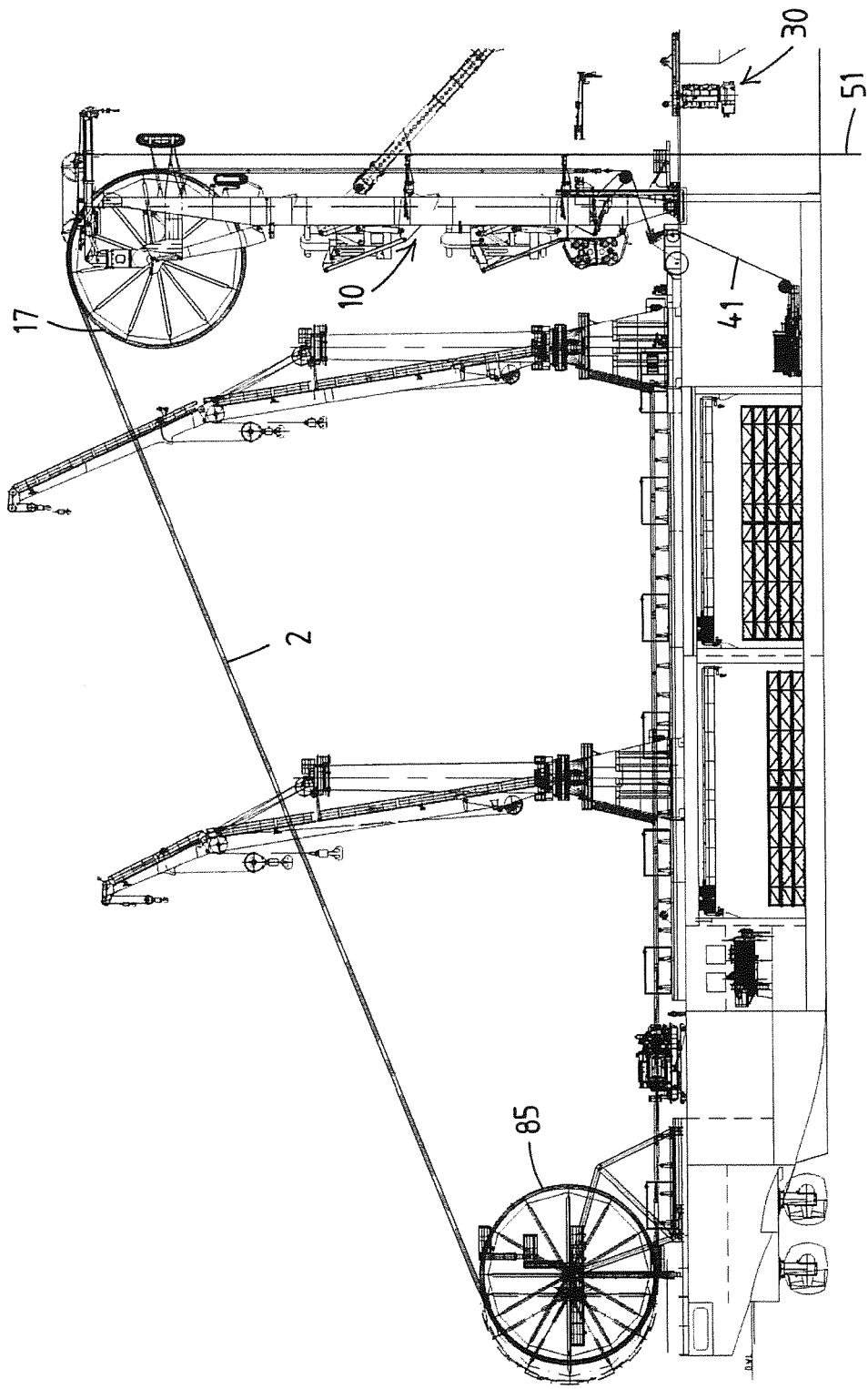

FIG. 15 illustrates the step of bringing the tower 10 into a vertical position, which is done here after the seagoing pipeline 2 has reached the seabed. In order to maintain a constant distance between the diverter 85 and the diverter 17 at this moment, the actuator 88 is operated to move the diverter 85, here forward as represented by the dashed lines. As discussed this forward motion of the diverter 85 may entail a corresponding motion of the one or more mobile stations 80.

As is known in the art the cable connector 53 can be disconnected from A&R head 105 by means of an underwater ROV.

Figure 16:
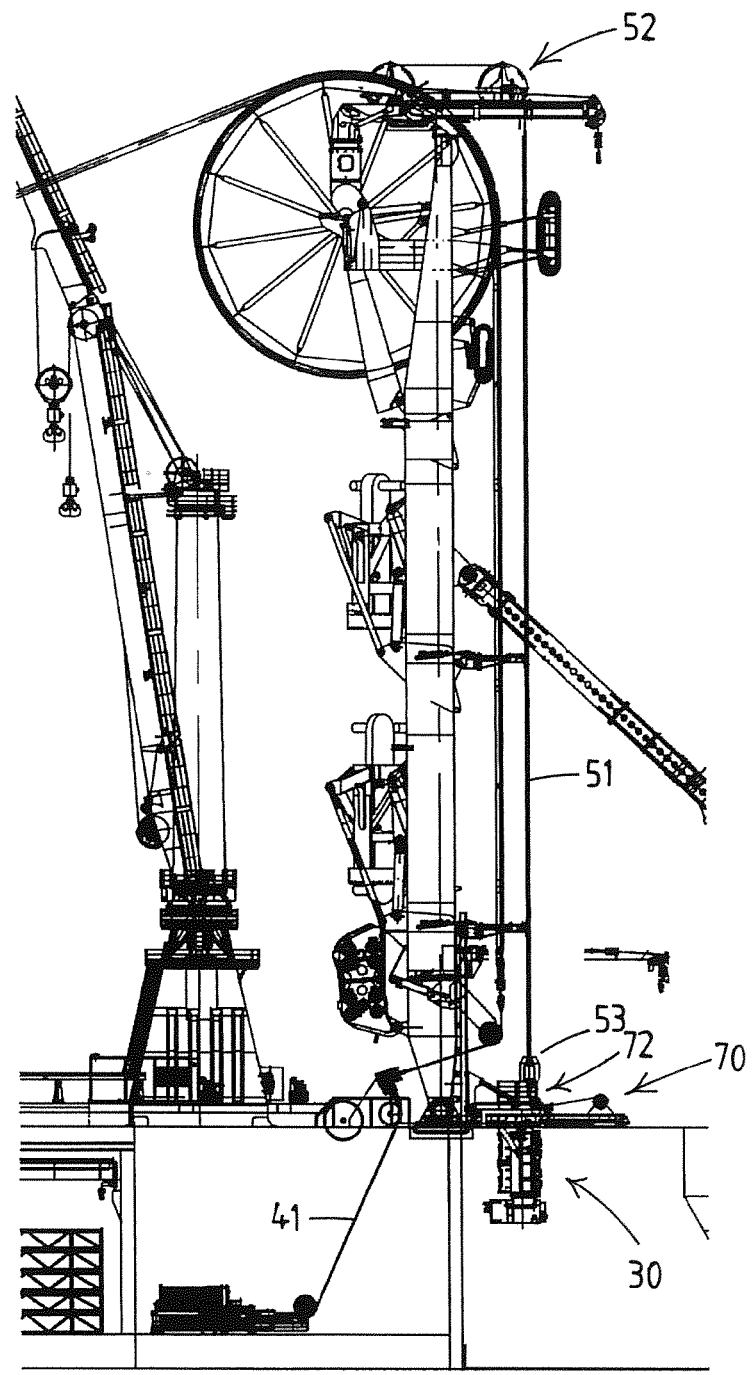

FIG. 16 illustrates that the A&R cable has been hoisted up until the connector 53 reaches the level of the tugger sheave 72 so that the tugger cable 71 can be reconnected to the connector 53. Here this entails shifting the hatch cover carrier 31 back over the moonpool, so that also the clamp 30 is moved along.

Figure 17:
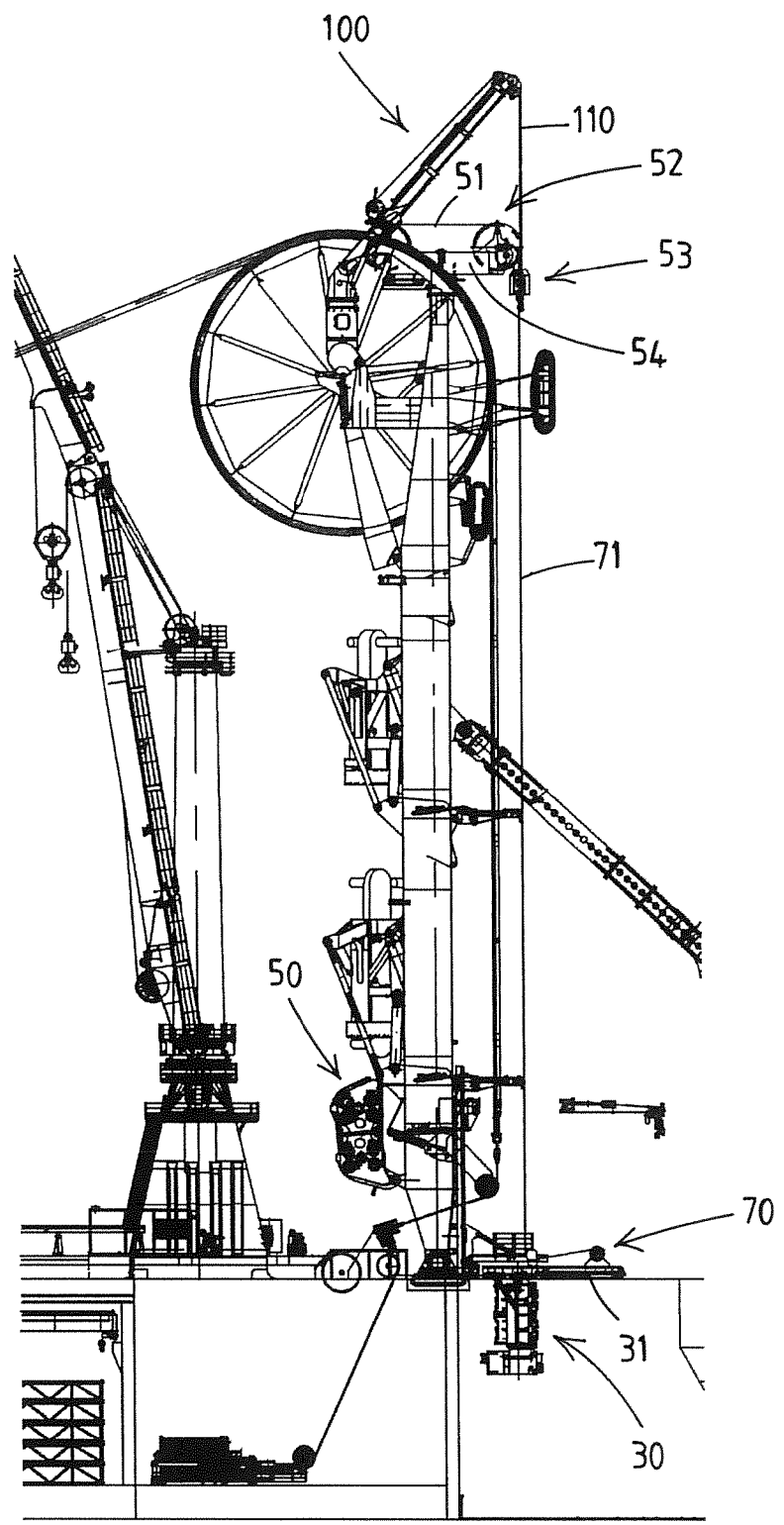

FIG. 17 illustrates that the A&R cable 71 is further hoisted upwards. In this process, as the eyes of the centralizers 20, 21 in closed condition do not allow for passage of the connector 53, the centralizers 20, 21 are opened. The tugger cable 71 keeps the A&R cable 51 under a back tension so that the cable 71 is properly retracted by the winch 50, commonly a traction winch in combination with an A&R cable storage winch. Once the connector 53 has reached its parking position underneath the sheave 52, the tugger cable 71 is detached and then connected to the hoisting cable 110 of the winch 100.

Figure 18:
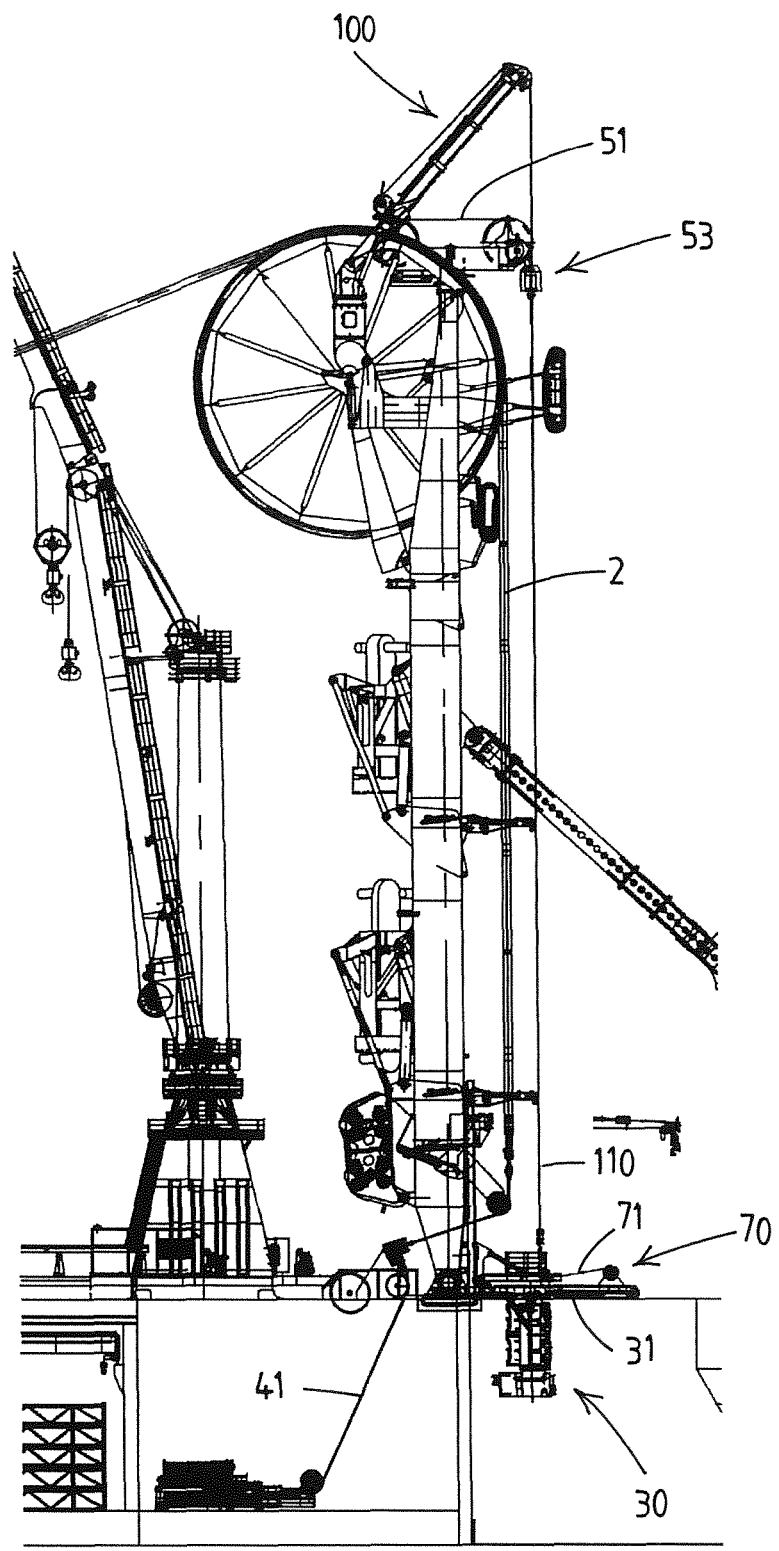

FIG. 18 illustrates that the cable 71 has been lowered using the cable 110 of the service crane 100. The cable 71 has been spooled back onto the tugger winch 70.

Figure 19:
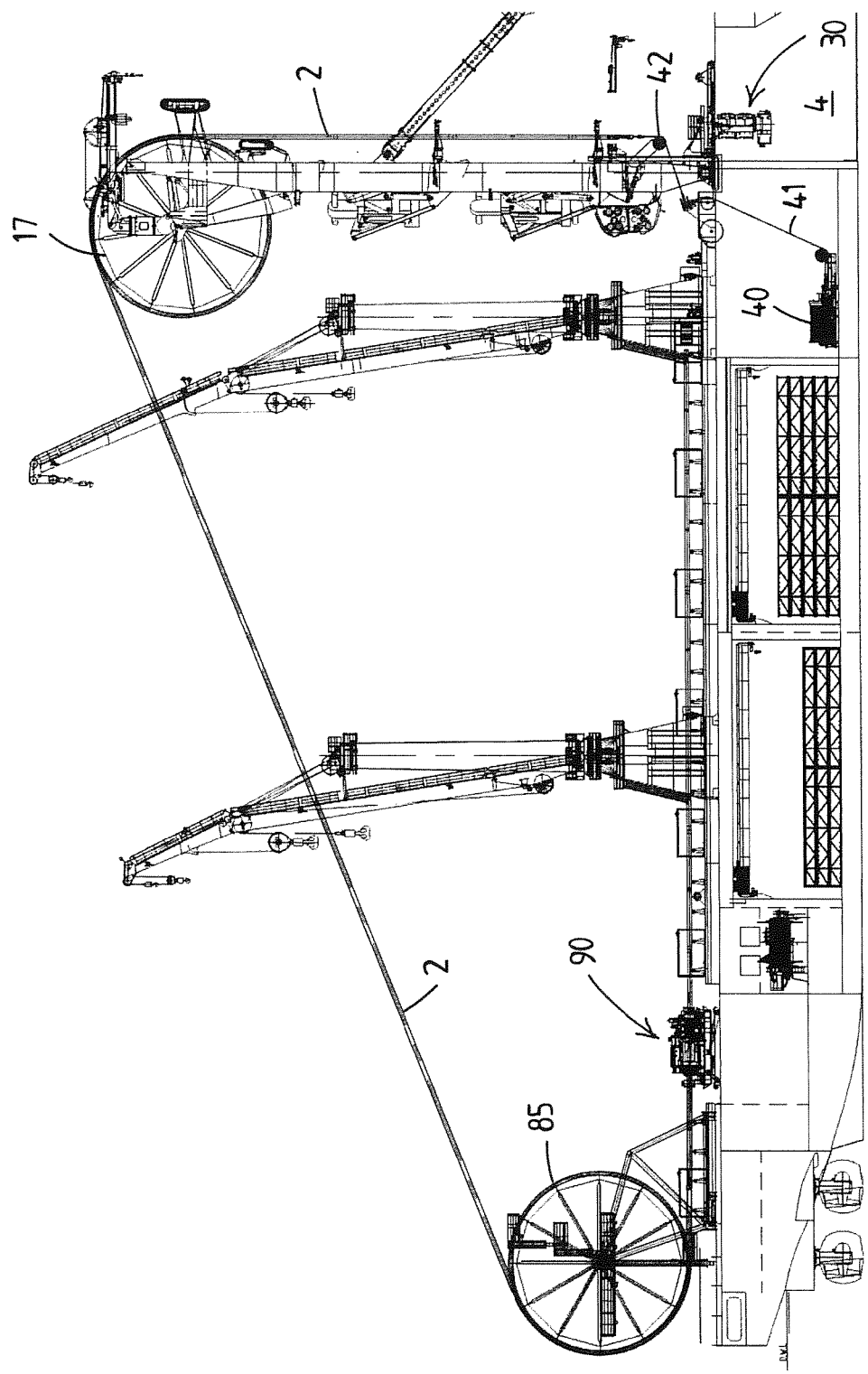

FIG. 19 illustrates that the cantilever beam supporting the A&R sheave 52 has been moved in order to move the A&R sheave out of alignment with the firing line 11. The vessel can ride our severe weather with the pipeline 2 being held under tension between the cable 41 and the tensioner 90. The winch 40 can be controlled to maintain a constant tension.

Once weather conditions have improved the A&R cable is first pulled down by the tugger winch system to about deck level and then lowered onward down to the seabed. The cable 51 is then connected to the head 105 of the seagoing pipeline, which is then raised by means of the A&R winch 50 so that the upper end thereof is above the level of the clamp 30. The clamp 30 is then returned into operative position and made to engage on the pipeline, so that the load is transferred onto the clamp. The A&R connector is then raised further as described above.

Pipelaying can now easily be resumed as will be appreciated by the skilled person. The pipeline section held rather closely along the tower 10 can be brought back into the more remote firing line 11 by means of actuation of actuators 19 and 44 so that the diverter 17 and the sheave 42 move and so bring the intermediate pipeline section into the firing line 11 again. This motion of the pipeline section can be combined with a motion to keep the distance between the diverters 17 and 85 constant, e.g. moving the diverter 85 and/or inclination of the tower 10.

The tensioners 15, 16 can also be returned to operative mode and made to engage on the pipeline 2 in the firing line 11. Once the tensioners, or at least one of them, engage on the pipeline, there is no more need for the tensioning by means of the cable 41. The head 106 can be removed from the pipeline end below the lower tensioner 15.

The pipe assembly process can be started again, and the pipeline 2 then lowered towards the upper end of the seagoing pipeline from which the head 105 has been removed. By interconnecting the pipeline 2 held in the tensioners 15, 16 with the seagoing pipeline held by clamp 30 the pipeline 2 is again ready to be laid in the described manner.

It will be appreciated that the abandonment method results in a minimal loss of pipeline as the section that was held along the tower 10 by the cable 41 has not been subjected to undue stresses or the like and thus can readily be integrated into the pipeline to be laid on the seabed.

As illustrated here the initiation system may be used in the A&R procedure to act as an auxiliary tensioning device that restrains the pipeline section which is to be shifted away from the firing line in the course of the procedure. It will be appreciated that, if desired, instead of the initiation system another winch, cable, and sheave arrangement may be used in a similar manner. For example a dedicated winch system is provided for this task in addition to the pipelaying initiation system. For example a smaller capacity winch may be employed in combination with a multiple falls sheave arrangement with one sheaves block having a set of sheaves, which block is to be connected to the pipeline section to be tensioned and another sheaves block being attached to the tower or to another support structure, e.g. a mobile structure on the deck of the vessel.

Figure 20:
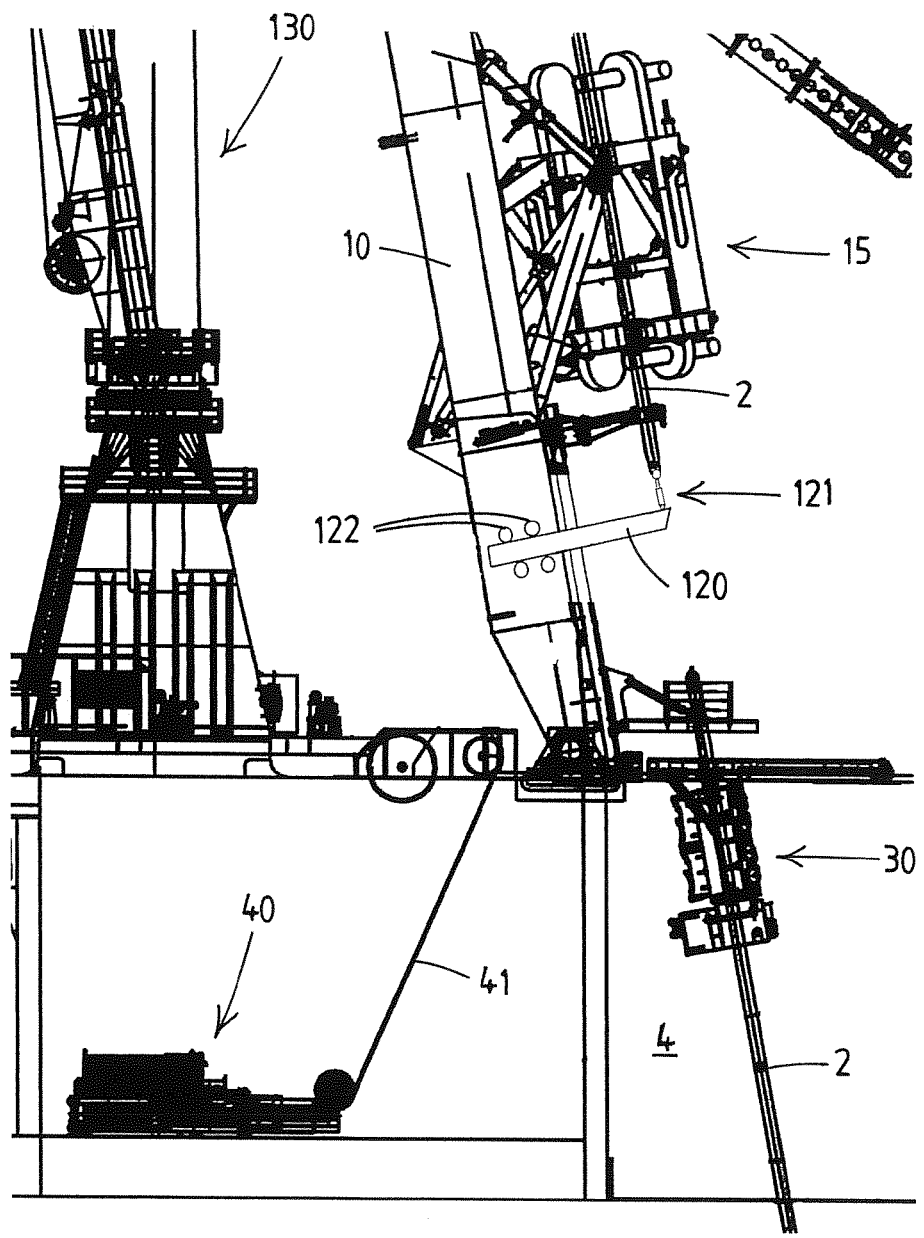
FIG. 20 illustrates an alternative embodiment of the auxiliary tensioning device.

FIG. 20 schematically illustrates in a view corresponding to FIG. 6a yet another embodiment of the auxiliary tensioning device. In this example the device comprises a mobile arm mounted on the lower region of the tower, between the lowermost tensioner 15 and the deck. Here the mobile arm 120 that is movable in a plane transverse to the height of the tower 10. In this example the arm 120 is slidable in longitudinal direction of the vessel, so in a direction that is the same as the diverter 17. In another example the arm 120 is pivotal about an axis aligned with the height of the tower, e.g. practical in embodiments wherein the diverter 17 is pivotal in similar manner in order to move away from the firing line 11.

The arm 120 is here guided between rollers 122 on the frame of tower 10 so as to be movable between a retracted position, generally away from the firing line, and an active position wherein the outer end of the arm is in the firing line. For example one of the rollers 122 includes a motor drive like a driven wheel to move the arm 120, or a hydraulic drive for the arm 120 is provided.

In this example the mobile arm 120 is provided with a hydraulic tensioning and connection member 121 that connects on outer end of the arm to the lower end of the pipeline section 2 held in the tensioners 15, 16. For example the member 121 includes one or more hydraulic cylinders that provided the tension that allows to relieve the load from the tensioners 15, 16 as explained above with reference to cable 41. For example one or more hydraulic cylinders are directly placed between the arm 120 and the pipeline section, or the one or more hydraulic cylinder engage on a multiple fall cable arrangement, with one block mounted on the arm 120 and the other fitted to the pipeline section to be tensioned. Instead of one or more hydraulic cylinders the multiple fall cable can be connected to a winch having a drum. The mobile arm 120 is embodied and supported on the tower 10 such that it allows to move the member 121 and pipeline section tensioned thereby away from the firing line 11 as explained above.

In an embodiment the sheave 42 for the initiation cable 41 is arranged on the same arm 120.

In an embodiment the engagement of the auxiliary tensioning device is not below the lowermost tensioner 15 but between the tensioners 15 and 16. This can, for example, be done by making the second cut 102 above the tensioner 15 and moving the separated part of the pipeline out of the lowermost tensioner by means of the service crane 100. The A&R procedure can than basically be performed similar to the description presented above, possibly with a further mobile platform being provided to allow personnel to couple the auxiliary tensioning device, e.g. initiation cable 41, to the lower end of the pipeline section held by the upper tensioner 16.

The auxiliary tensioning device and its use as described herein may also be used advantageously for other situations than the abandonment of the pipeline, e.g. when connecting an accessory to the end of the pipeline or when integrating an accessory in the pipeline, said accessory having greater cross-sectional dimensions than the pipeline. For example when a PLET terminal is to be connected to the end of the seagoing pipeline, one can envisage that the pipeline section originally held by the tensioners 15, 16 is cleared from the firing line, and the PLET terminal is held above the upper end of the seagoing pipeline and connected thereto, for example the PLET terminal being hoisted in place by a mast or pedestal crane 130 onboard the vessel having a reach above the moonpool 4. The accessory can then be suspended from the A&R cable 51 and the pipeline 2 with PLET terminal lowered into the sea.

Figure 21:
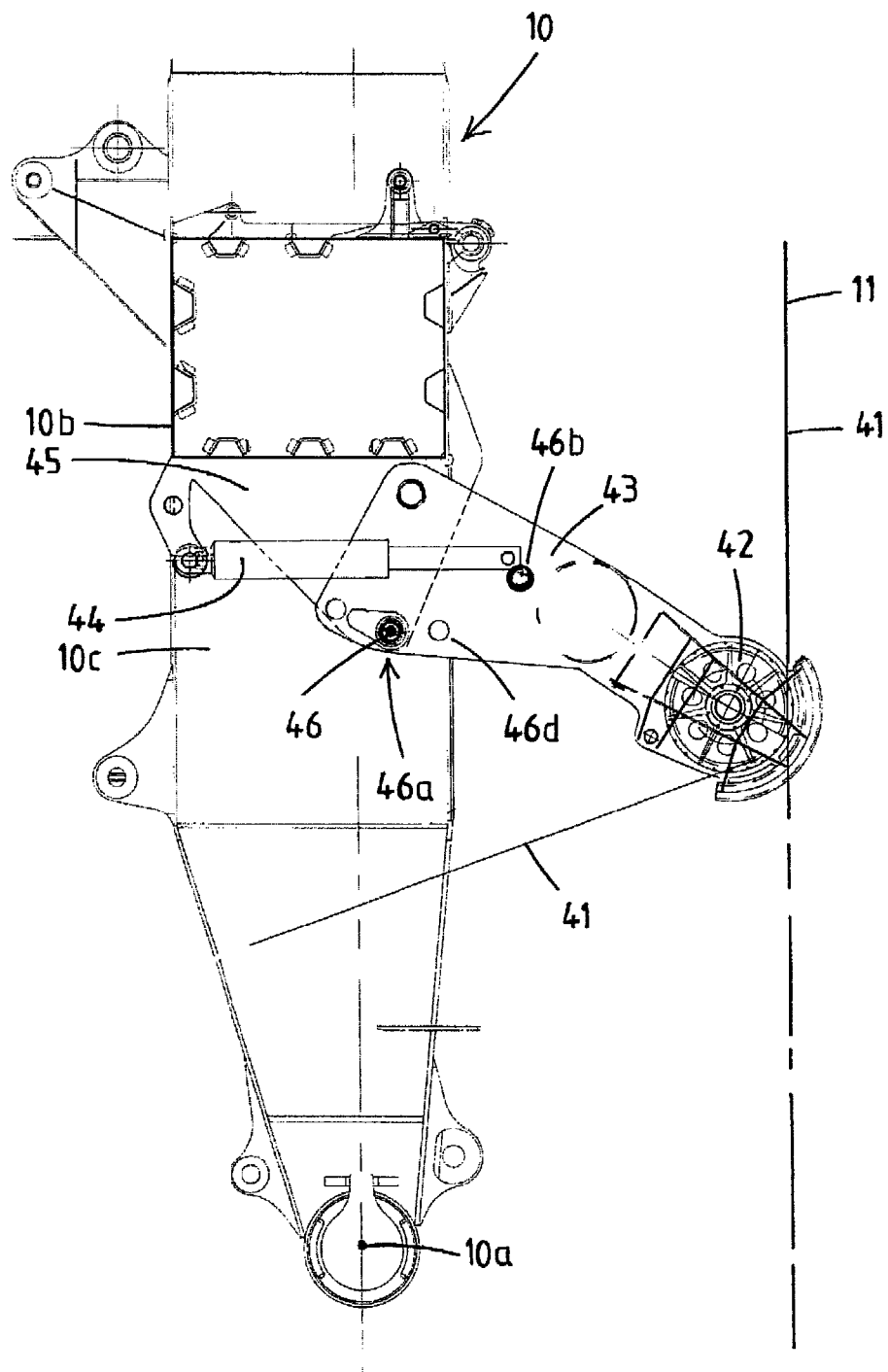
FIGS. 21-23 illustrate an embodiment of an auxiliary tensioning device sheave and corresponding pivotal arm, as well the alternative use of an auxiliary tensioning device sheave in an A&R method.
Figure 22:
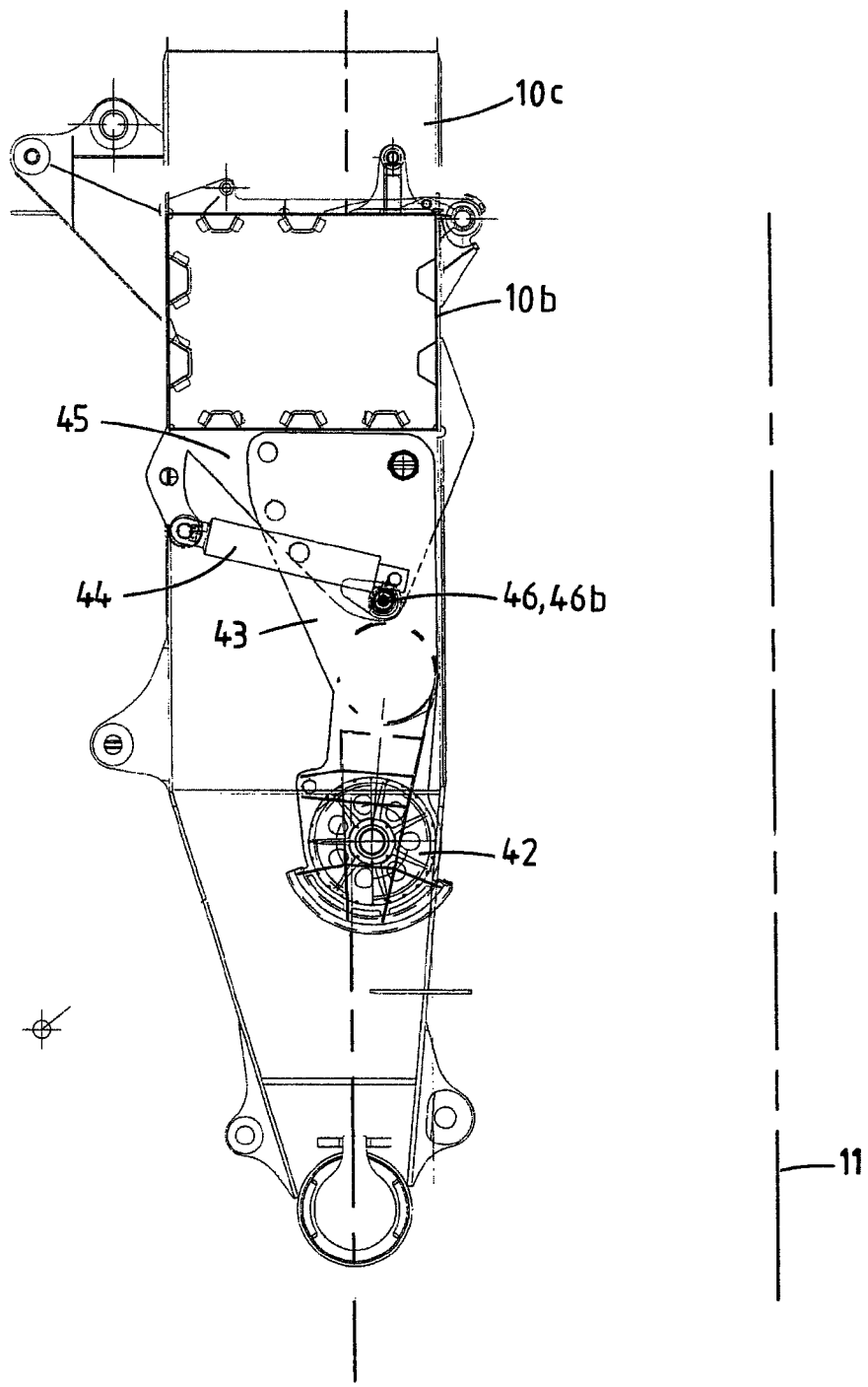
Figure 23:
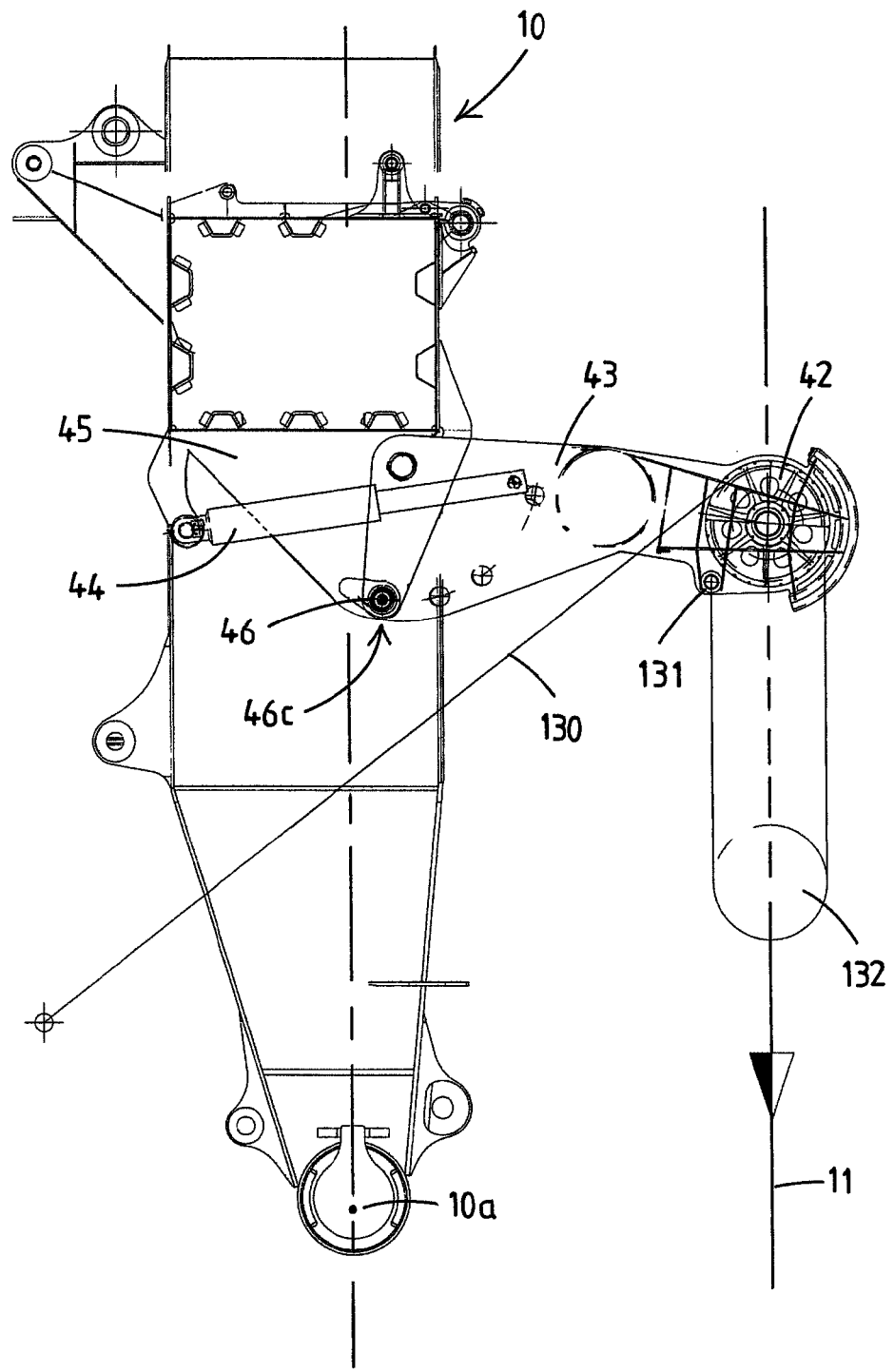

With reference to FIGS. 21-23 now an embodiment of an auxiliary tensioning device sheave and corresponding pivotal arm FIGS. 21-23 illustrate, as well the alternative use of an auxiliary tensioning device sheave in an A&R method.

These FIGS. 21-23 show a lower portion of the tower 10 with a cross frame box member 10b between parallel vertical frame members 10c of the tower 10. A bracket 45 is mounted on the cross member 10b, which bracket 45 carries the arm 43 in pivotal manner about axis 43a. The actuator 44, here hydraulic cylinder, is provided to pivot the arm 43. As is preferred, a mechanical locking device is provided to lock the arm 43 at least in its active position wherein the cable sheave 42 is aligned with firing line 11. In this example the locking device comprises a locking pin 46 that is inserted through a locking hole 46a in the arm 43 corresponding to this position.

In FIG. 22 the arm 43 has been brought into retracted position, here between the vertical frame members 10c of the tower 10. As is preferred, pin 46 is inserted through a locking hole 46b corresponding to this retracted position.

As indicated in the introductory part it may be attractive to use the sheave 42 not only for the method to vacate the firing line as explained herein, but it is also envisaged that the sheave 42 is to be used in an alternative A&R procedure wherein this sheave acts as an A&R cable suspension sheave of a second A&R system of the installation, e.g. the second A&R system having a lower A&R load and/or A&R depth capacity than the first system that includes the A&R cable suspension sheave 52 arranged above the uppermost tensioner 16.

In FIG. 21 a dashed line depicts cable 130 that passes in a single fall arrangement from a winch, e.g. an A&R winch or even the initiation cable winch 41, over the sheave 42 and departing this sheave 42 in the firing line 11 and then downwards along the firing line 11 towards the seagoing pipeline (not shown). For example the cable 130 is the earlier described initiation winch cable 41 which allows for a lower A&R load and/or reduced A&R depth compared to the main or first A&R system with cable 51 and sheave 52 above the uppermost tensioner. It is envisaged that during this alternative A&R procedure, the part of the pipeline that was held in the one or more tensioners ahead of the A&R procedure remains held in said one or more tensioners, advantageously in the firing line as there is no need then to vacate the firing line for the A&R procedure.

FIG. 23 depicts how the load capacity of this alternative or second A&R system can be increased by arranging the end of the cable 130 as a dead end 131, here on the arm 43 itself, and providing a travelling A&R sheave 132 in a double fall A&R cable arrangement. In order to align the double fall A&R cable with the firing line the actuator 44 is operated to bring the arm 43 in a corresponding position, slightly outward of the position of FIG. 21. As is preferred this position is mechanically lockable as well, here by pin 46 inserted through corresponding hole 46c.

A further locking hole 46d is provided to secure the arm 43 in a position wherein the pipeline section originally held in the one or more tensioners has been vacated from the firing line 11.

Figure 24:
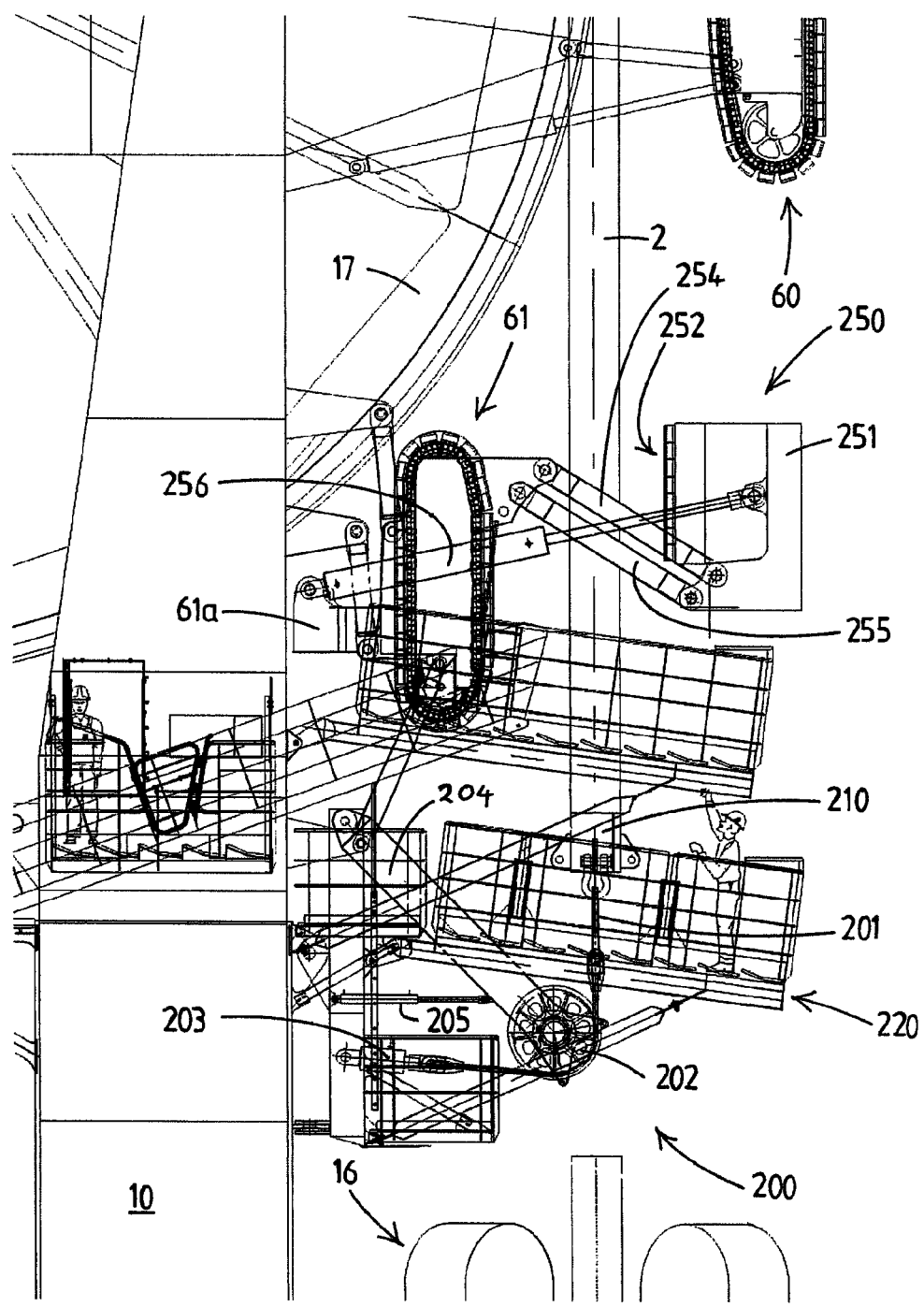
FIGS. 24-26 a, b illustrate the provision and use of an additional or second auxiliary tensioning device that is arranged between the pipeline diverter and the uppermost tensioner and of a pipeline retention clamp.
Figure 25:
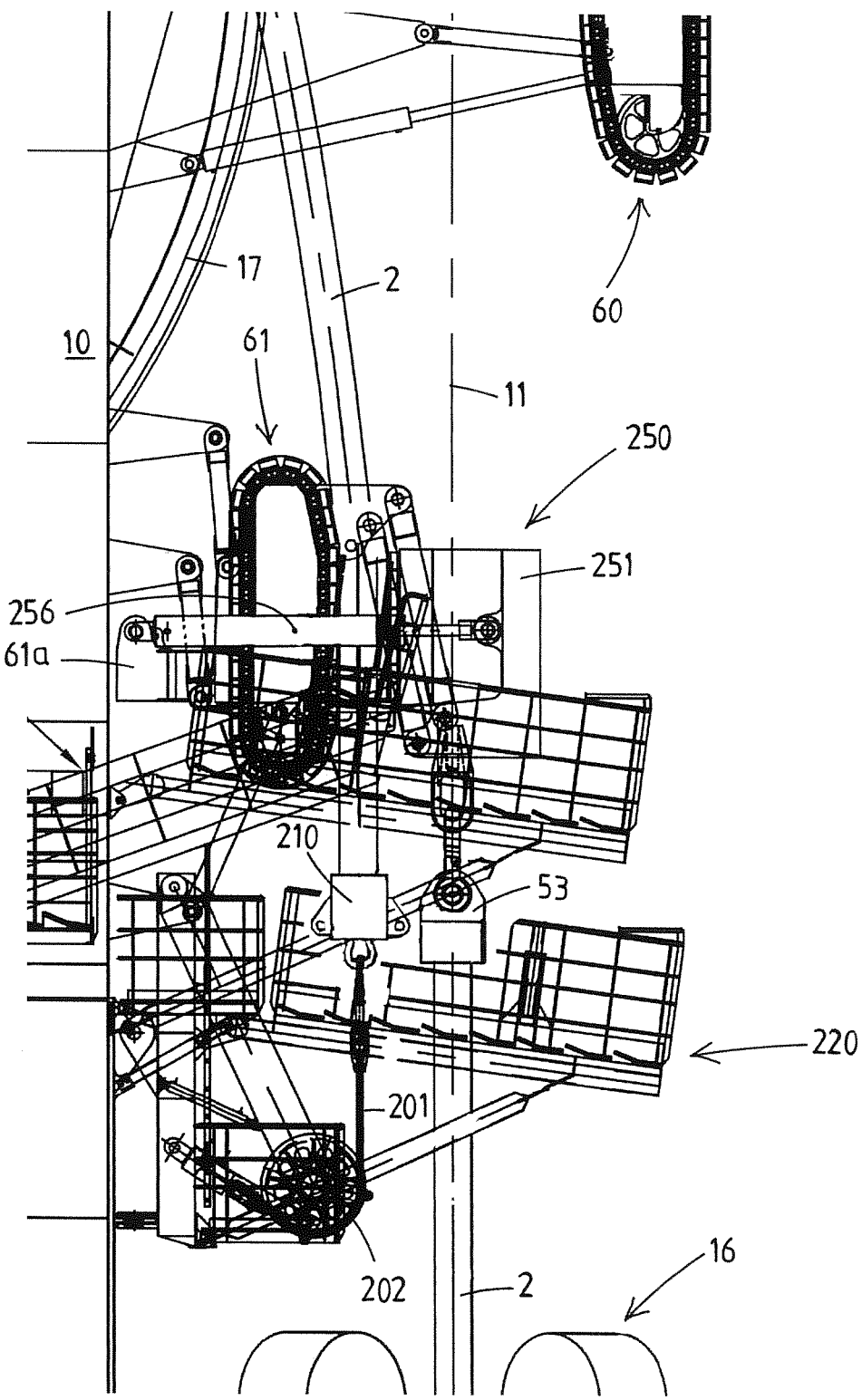
Figure 26A:
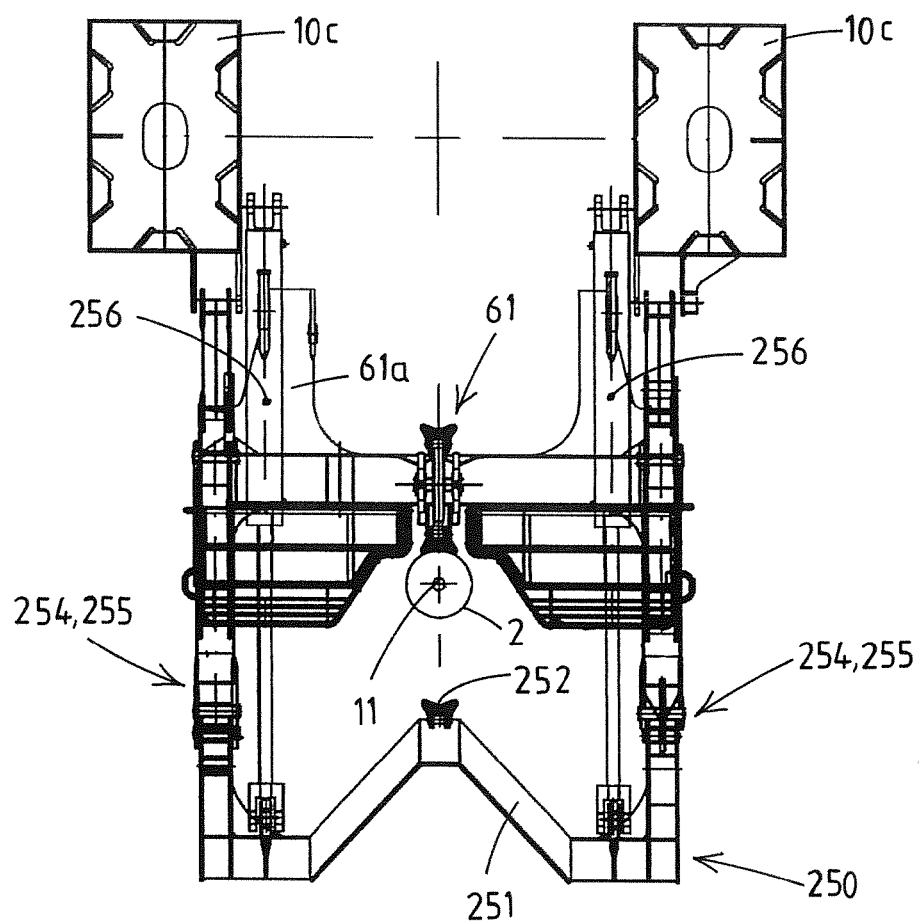
Figure 26B:
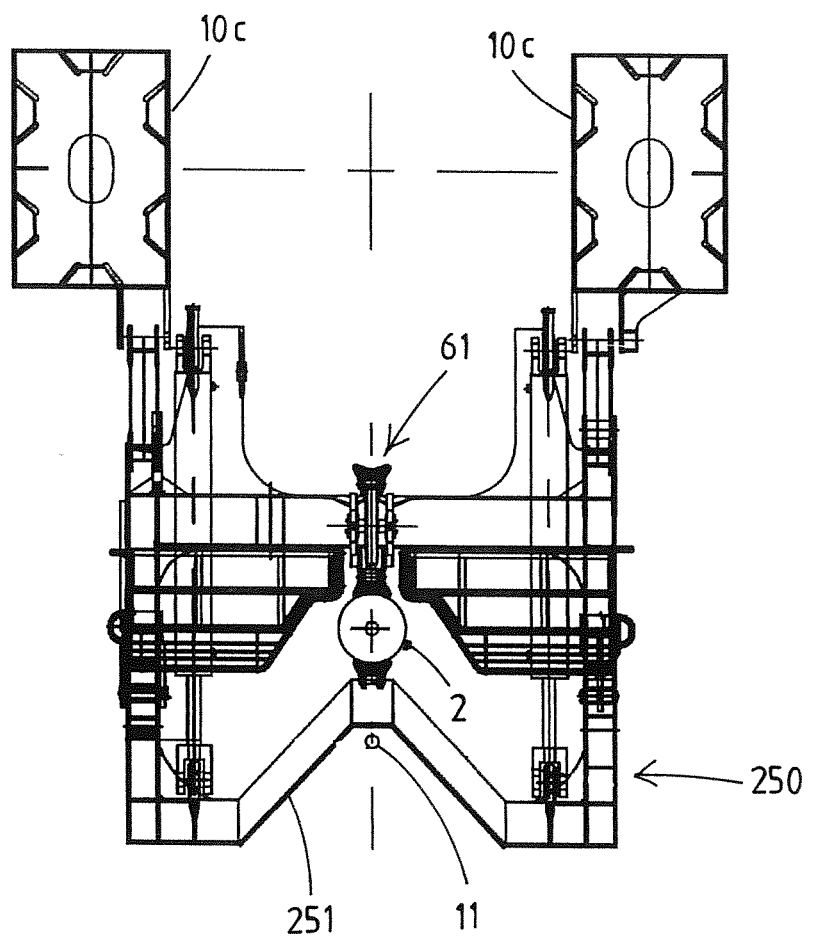

With reference to FIGS. 24-26 now the optional provision and use of an additional or second auxiliary tensioning device 200 that is arranged between the pipeline diverter 17 and the uppermost tensioner 16 supported by the tower 10 will be discussed.

In some circumstances it will be desirable to clear the firing line below the diverter 17 entirely (apart from one or more tracks of the straightener), e.g. when a very tall pipeline accessory is to be placed in the firing, e.g. a buoyancy tank of a pipeline riser structure. The provision of retractable tensioners 15, 16 allows to retracted these tensioners 15, 16, e.g. so that they are entirely behind the front face of the tower 10 as shown in FIG. 10. In this situation it may then also be desired to completely remove the pipeline section originally held by these tensioners 15, 16, so not even hold this pipeline section in a position along the tower, yet away from the firing line.

In this situation, and desiring the keep the pipeline 2 extending over the diverter 17, e.g. also further over the diverter 85, it is envisaged to make use of the device 200.

It is envisaged that before the pipeline is severed near the device 200, a yoke is connected to the pipeline 2 above the desired location for severing the pipeline 2. This yoke 210 has two diametrically opposed yoke ends (at right angles to the plane of FIG. 24), each yoke end being connected to a corresponding cable 201 of the auxiliary tensioning device 200.

Each cable 201 runs over a sheave 202 and is connected to a dead end fitting 203 that is stationary mounted on the tower 10. As is preferred, the dead end fitting 203 is provided with an actuator, here a hydraulic cylinder, to tension the cable 201 allowing to relieve the pipeline back tension from the tensioners 15, 16. The sheaves 202 are mounted at spaced part positions on a pivotal arm 204 that is pivotal about a horizontal axis relative to the tower 10 by means of one or more actuators, here hydraulic cylinder 205.

A work platform 220 is provided at the level of the device 200 allowing personnel to perform the fitting of the yoke 210 and the severing of the pipeline 2.

Once the yoke 210 is fitted, the back tension of the pipeline can be absorbed by the device 200 instead of the tensioners and the pipeline 2 can be severed below the yoke 210.

Then it is envisaged that the arm 204 is pivoted so as to vacate the pipeline 2 held by device 200 from the firing line, with the diverter 17 being commanded to make a similar motion away from the firing line. The end situation is shown in FIG. 26. As can be seen the straightener tracks 60, 61 have already been moved away from the firing line to allow for this motion and to clear the firing line.

In the FIGS. 24-27 also the provision of an additional pipeline retention clamp 250 is illustrated which is adapted to clamp the pipeline 2, effectively between this pipeline retention clamp 250 and a straightener track 61 that is arranged below the diverter 17. As is preferred the pipeline retention clamp 250 is arranged in combination with and above the auxiliary tensioning device 200.

The clamp 250 is thus embodied to frictionally engage on the pipeline 2 opposite from the track 61, so that—with the track 61 being held stationary—the pipeline 2 is immobile.

The clamp 250 has a clamp body 251 with a friction face 252 provided with one or more friction pads or the like. The clamp body 251 is mobile mounted on the frame 61 a supporting the track 61, which frame 61 is in turn mobile mounted on the tower 10 so as to allow for motion of the track between a position to engage on the pipeline in the firing line and a retracted position (see FIG. 24).

The clamp body 251 here is connected to the frame 61 a of the straightener track 61 by a parallel arms mechanism with parallel arms 254, 255—here a set at each side of the clamp—so that the friction face of the clamp. One or more actuators 256, here one hydraulic cylinder at each side of the clamp body 251, cause the motion of the clamp body 251 as well as cause the desired clamping forces.

In top view the clamp body 251 may be V-shaped, with the friction face 252 at the top of the V which points towards the pipeline 2 and with the actuators 256 connected to the outer ends of the V-shaped body 251 that are further away from the pipeline 2. As a result of the V-shape, the clamp 251 in the clamped position with the track 61 in its retracted position (FIGS. 25 and 26b), has a recess and its side facing away from the clamped pipeline 2 and the clamp body 251 then does not interfere with the firing line and, for example, allows for the lowering of the A&R cable 51 along the firing line. FIG. 25 depicts that the A&R cable connector 53 has been connected to the upper end of the pipeline 2 passing through, and preferably still held, in the one or more tensioners 16. This allows for yet another alternative A&R procedure to be performed, especially when in combination with device 200 as described above.

It will be appreciated that the device 200 and the clamp 250 may be provided both on a tower 10 but one can also imagine that just one of these components is provided on the tower.

The invention claimed is:

1. A method for installing a pipeline on a seabed from a marine pipelaying vessel, said method comprising pipelaying and abandonment of said pipeline, the marine pipelaying vessel comprises:
   a pipeline launch tower; a pipeline diverter which is supported at an elevated position on the pipeline launch tower;
   one or more tensioners supported by the pipeline launch tower below the pipeline diverter;
   an abandonment and recovery system (A&R) for abandonment and recovery of the pipeline, said A&R system comprising:
      an A&R winch and A&R cable,
      an A&R cable suspension sheave; and
      a hang-off clamp;
   an auxiliary tensioning device comprising an auxiliary winch, an auxiliary tensioning cable and an auxiliary tensioning cable sheave which is movable between an active position aligned with a firing line and a retracted position remote from said firing line,
   the pipelaying method comprising:
   lowering the pipeline along the firing line into the sea via the one or more tensioners, said one or more tensioners engaging on the pipeline as so to support a weight of the pipeline,
   wherein the abandonment of the pipeline comprises:
   halting the pipelaying and engaging the hang-off clamp with the pipeline at a position below the one or more tensioners;
   transferring the weight of the pipeline onto the hang-off clamp and holding the pipeline in the firing line via the hang-off clamp;
   splitting the pipeline between the hang-off clamp and the one or more tensioners so that an upper section of the pipeline is held by the one or more tensioners and a seagoing section of the pipeline is held by the hang-off clamp;
   connecting the auxiliary tensioning cable of the auxiliary tensioning device to a lower end of the upper section of the pipeline held by the one or more tensioners, said auxiliary cable sheave being in the active position thereof;
   transferring pipeline tension from the one or more tensioners onto the auxiliary tensioning device;

releasing the one or more tensioners from the upper section pipeline, so that the upper section of the pipeline is held in the firing line between the pipeline diverter and the auxiliary tensioning device;

emptying the firing line by at least displacing both the pipeline diverter and the auxiliary cable sheave of the auxiliary tensioning device to the retracted position thereof and thereby displacing said upper section of the pipeline from the firing line;

arranging the A&R cable in the firing line emptied by said upper section of the pipeline;

connecting the A&R cable to an upper end of the seagoing section of the pipeline held by the hang-off clamp in the firing line;

transferring the weight of the seagoing section of the pipeline from the hang-off clamp onto the A&R cable;

releasing the hang-off clamp from the seagoing section of the pipeline; and operating the A&R winch and thereby lowering the seagoing section of the pipeline onto the seabed.

2. The method according to claim 1, wherein said auxiliary tensioning device is an initiation system for the initiation of pipelaying, wherein said auxiliary winch is an initiation winch, wherein said auxiliary tensioning cable is an initiation cable, and wherein said auxiliary tensioning cable sheave is an initiation cable sheave.

3. The method according to claim 1, wherein the pipeline launch tower is further provided with a straightener assembly including one or more straightener tracks that straighten the pipeline as the pipeline exits the pipeline diverter during pipelaying.

4. The method according to claim 1, wherein the pipeline launch tower is provided with one or more centralizers each forming an eye that can be opened and closed and that is adapted to maintain a cable or the pipeline centralized in the firing line, and wherein the step of emptying the firing line is preceded by opening the eye of one or more centralizers so as to allow the displacement of the upper section of the pipeline in said emptying step.

5. The method according to claim 1, wherein the marine pipelaying vessel further comprises:

a horizontal pipeline assembly line with one or more pipe connecting stations, and wherein the pipelaying involves connecting pipes end to end to form the pipeline to be laid, said pipeline being passed directly via a pipeline feed trajectory to the pipeline diverter on the pipeline launch tower.

6. The method according to claim 5, wherein the horizontal pipeline assembly line has an assembly direction for the pipeline that is directed away from the pipeline launch tower, and wherein the marine pipelaying vessel further comprises an assembly line diverter that diverts the pipeline upward and to the pipeline diverter on the pipeline launch tower.

7. The method according to claim 6, wherein the step of emptying the firing line further comprises displacing the assembly line diverter and displacing any pipeline present in the horizontal pipeline assembly line in a manner so as to maintain a constant distance between the assembly line diverter and the pipeline diverter on the pipeline launch tower.

8. The method according to claim 5, wherein the horizontal pipeline assembly line comprises an assembly line tensioner engaging on the pipeline near the end of the horizontal pipeline assembly line allowing to tension the pipeline between said assembly line tensioner and the one or more tensioners on the pipeline launch tower during pipelaying and between said assembly line tensioner and the auxiliary tensioning device in the course of the abandonment of the pipeline.

9. The method according to claim 1, wherein the one or more tensioners on the pipeline launch tower each comprise a tensioner frame and multiple tracks supported by the tensioner frame, said tracks engaging on the pipeline during pipelaying, and wherein each tensioner frame is mounted on the pipeline launch tower and the tensioner frame is configured to be movable between an active position wherein the tracks can engage on the pipeline during pipelaying and a retracted, non-operative position wherein the tensioner frame is remote from the firing line, and wherein the step of emptying the firing line comprises the displacement of the one or more tensioners on the pipeline launch tower into their retracted, non-operative position.

10. A method for installing a pipeline on a seabed from a marine pipelaying vessel, said method comprising pipelaying and abandonment of said pipeline, the marine pipelaying vessel comprises:

a pipeline launch tower;

a pipeline diverter which is supported at an elevated position on the pipeline launch tower;

one or more tensioners supported by the pipeline launch tower below the pipeline diverter;

an abandonment and recovery system (A&R), said A&R system comprising:

an A&R winch and A&R cable;

an A&R cable suspension sheave; and a hang-off clamp;

the pipelaying method comprising the steps of:

lowering the pipeline along a firing line into the sea via the one or more tensioners, said one or more tensioners engaging on the pipeline as so to support a weight of the pipeline, and the abandonment of the pipeline comprises the steps of:

halting the pipelaying and engaging the hang-off clamp with the pipeline at a position below the one or more tensioners;

transferring the weight of the pipeline onto the hang-off clamp and holding the pipeline in the firing line via the hang-off clamp;

splitting the pipeline between the hang-off clamp and the one or more tensioners so that an upper section of the pipeline is held by the one or more tensioners and a seagoing section of the pipeline is held by the hang-off clamp;

connecting an auxiliary tensioning device to a lower end of the pipeline held by the one or more tensioners;

transferring pipeline tension from the one or more tensioners onto the auxiliary tensioning device;

releasing the one or more tensioners from the upper section of the pipeline, so that the upper section of the pipeline is held in the firing line between the pipeline diverter and the auxiliary tensioning device;

emptying the firing line by at least displacing both the pipeline diverter and the auxiliary tensioning device and thereby displacing said upper section of the pipeline from the firing line;

arranging the A&R cable in the firing line emptied by said upper section of the pipeline;

connecting the A&R cable to an upper end of the seagoing section of the pipeline held by the hang-off clamp in the firing line;

transferring the weight of the seagoing section of the pipeline from the hang-off clamp onto the A&R cable;

releasing the hang-off clamp from the seagoing section of the pipeline; and operating the A&R winch and thereby lowering the seagoing section of the pipeline onto the seabed, wherein the step of splitting the pipeline between the hang-off clamp and the one or more tensioners comprises making several cuts at different heights in the pipeline and thereby removing a pipeline part between the lower end of the upper section of the pipeline held by the one or more tensioners and an upper end of the seagoing section of the pipeline held by the hang-off clamp, wherein said emptying of the firing line creates an empty space, and wherein the auxiliary tensioning device is moved into said empty space and into a position underneath the lower end of the upper section of the pipeline held by the one or more tensioners.

11. A method for installing a pipeline on a seabed from a marine pipelaying vessel, said method comprising pipelaying and abandonment of said pipeline, the marine pipelaying vessel comprises:

a pipeline launch tower;

a pipeline diverter which is supported at an elevated position on the pipeline launch tower;

one or more tensioners supported by the pipeline launch tower below the pipeline diverter;

an abandonment and recovery system (A&R), said A&R system comprising:

an A&R winch and A&R cable;

an A&R cable suspension sheave; and a hang-off clamp;

the pipelaying method comprising the steps of:

lowering the pipeline along a firing line into the sea via the one or more tensioners, said one or more tensioners engaging on the pipeline as so to support a weight of the pipeline, and the abandonment of the pipeline comprises the steps of:

halting the pipelaying and engaging the hang-off clamp with the pipeline at a position below the one or more tensioners;

transferring the weight of the pipeline onto the hang-off clamp and holding the pipeline in the firing line via the hang-off clamp;

splitting the pipeline between the hang-off clamp and the one or more tensioners so that an upper section of the pipeline is held by the one or more tensioners and a seagoing section of the pipeline is held by the hang-off clamp;

connecting an auxiliary tensioning device to a lower end of the pipeline held by the one or more tensioners;

transferring pipeline tension from the one or more tensioners onto the auxiliary tensioning device;

releasing the one or more tensioners from upper section of the pipeline, so that the upper section of the pipeline is held in the firing line between the pipeline diverter and the auxiliary tensioning device;

emptying the firing line by at least displacing both the pipeline diverter and the auxiliary tensioning device and thereby displacing said upper section of the pipeline from the firing line;

arranging the A&R cable in the firing line emptied by said upper section of the pipeline;

connecting the A&R cable to an upper end of the seagoing section of the pipeline held by the hang-off clamp in the firing line;

transferring the weight of the seagoing section of the pipeline from the hang-off clamp onto the A&R cable;

releasing the hang-off clamp from the seagoing section of the pipeline; and operating the A&R winch and thereby lowering the seagoing section of the pipeline onto the seabed, wherein the A&R cable is provided with an A&R cable connector, said A&R cable connector being held near the A&R cable suspension sheave during pipelaying, wherein the marine pipelaying vessel comprises a tugger system that is adapted to pull the A&R cable down to the upper end of the seagoing section of the pipeline, said tugger system comprising:

a tugger winch and tugger cable; and a tugger cable sheave, and wherein, after the step of emptying the firing line, the tugger cable is passed upward from the tugger cable sheave adjacent the upper end of the seagoing section of the pipeline along the firing line to the A&R cable connector, the A&R cable connector then being pulled downward towards the upper end of the seagoing section of the pipeline and connected there to.

12. A marine pipelaying installation to be mounted or mounted on a vessel for laying a pipeline on a seabed, wherein the marine pipelaying installation comprises:

a pipeline launch tower;

a pipeline diverter which is supported at an elevated position on the pipeline launch tower;

one or more tensioners supported by the pipeline launch tower below the pipeline diverter;

an abandonment and recovery system (A&R) configured to abandon and recover of the pipeline, said A&R system comprising:

an A&R winch and A&R cable; and an A&R cable suspension sheave that is mounted on the pipeline launch tower and configured to move relative to the pipeline launch tower;

an auxiliary tensioning device comprising an auxiliary winch, an auxiliary tensioning cable, an auxiliary tensioning cable sheave, and an auxiliary tensioning device displacement actuator, wherein the auxiliary tensioning cable sheave is movable by said auxiliary tensioning device displacement actuator between an active position aligned with a firing line and a retracted position remote from said firing line in order to empty said firing line; and a hang-off clamp, wherein the pipeline diverter is mounted on the pipeline launch tower and is configured to move relative to the pipeline launch tower, and wherein a pipeline diverter displacement actuator is provided allowing to displace the pipeline diverter between an active position wherein a pipeline passing over the pipeline diverter exits said pipeline diverter in the firing line and a retracted position wherein the pipeline diverter is remote from the firing line, wherein the auxiliary tensioning device is mounted, on the pipeline launch tower and is configured to move relative to the pipeline launch tower, wherein the marine pipelaying installation further comprises a controller that is adapted to control the pipeline diverter displacement actuator and the auxiliary tensioning device displacement actuator, and wherein said controller is adapted to provide retraction signals on the basis of which the pipeline diverter displacement actuator and the auxiliary tensioning device displacement actuator perform a retraction that displaces a pipeline section of said pipeline held between the auxiliary tensioning device and the pipeline diverter from the firing line in order to empty the firing line.

13. A marine pipelaying vessel provided with the installation according to claim 12.

14. The installation according to claim 12, wherein the installation further comprises:
    a horizontal pipeline assembly line with one or more pipe connecting stations, allowing to connect pipes end to end to form the pipeline to be laid during pipelaying, the pipeline passing from the horizontal pipeline assembly line directly via a pipeline feed trajectory to the pipeline diverter on the pipeline launch tower.

15. The installation according to claim 14, wherein the horizontal pipeline assembly line has an assembly direction for the pipeline that is directed away from the pipeline launch tower, and wherein the installation further comprises an assembly line diverter that diverts the pipeline upward and to the pipeline diverter on the pipeline launch tower.

16. The installation according to claim 15, wherein the assembly line diverter is displaceable and wherein an assembly line diverter actuator is provided to displace the assembly line diverter, and wherein the controller is adapted to provide a retraction signal on the basis of which the assembly line diverter actuator performs a retraction in unison with the retraction of the pipeline diverter and of the initiation cable sheave, allowing to maintain a constant distance between the assembly line diverter and the pipeline diverter on the pipeline launch tower during the step of emptying the firing line.

17. A marine pipelaying installation to be mounted or mounted on a vessel for laying a pipeline on a seabed, wherein the marine pipelaying installation comprises:
    a pipeline launch tower;
    a pipeline diverter which is supported at an elevated position on the pipeline launch tower;
    one or more tensioners supported by the pipeline launch tower below the pipeline diverter;
    an abandonment and recovery system (A&R) configured to abandon and recover of the pipeline, said A&R system comprising:
        an A&R winch and A&R cable; and
        an A&R cable suspension sheave that is mounted on the pipeline launch tower and configured to move relative to the pipeline launch tower;
    an auxiliary tensioning device; and
    a hang-off clamp,
    wherein the pipeline diverter is mounted on the pipeline launch tower and is configured to move relative to the pipeline launch tower, and wherein a pipeline diverter displacement actuator is provided allowing to displace the pipeline diverter between an active position wherein the pipeline passing over the pipeline diverter exits said pipeline diverter aligned with the firing line and a retracted position wherein the pipeline diverter is remote from the firing line,
    wherein the auxiliary tensioning is mounted on the pipeline launch tower and wherein auxiliary tensioning device displacement actuator is provided allowing to displace the auxiliary tensioning device between an active position aligned with the firing line and a retracted position remote from the firing line,
    wherein the marine pipelaying installation further comprises a controller that is adapted to control an operation of at least the pipeline diverter displacement actuator and the auxiliary tensioning device displacement actuator,
    wherein said controller is adapted to provide retraction signals on the basis of which the pipeline diverter displacement actuator and the auxiliary tensioning device displacement actuator perform a retraction that displaces a pipeline section of said pipeline held between the auxiliary tensioning device and the pipeline diverter away from the firing line,
    wherein said auxiliary tensioning device is an initiation system for initiation of pipelaying, said initiation system comprising an initiation winch, an initiation cable, and an initiation cable sheave, wherein the initiation cable sheave is movable between an active position aligned with the firing line and a retracted position remote from the firing line in order to empty the firing line.

18. A marine pipelaying installation to be mounted or mounted on a vessel for laying a pipeline on a seabed, wherein the marine pipelaying installation comprises:
    a pipeline launch tower;
    a pipeline diverter which is supported at an elevated position on the pipeline launch tower;
    one or more tensioners supported by the pipeline launch tower below the pipeline diverter;
    an abandonment and recovery system (A&R) configured to abandon and recover of the pipeline, said A&R system comprising:
        an A&R winch and A&R cable; and
        an A&R cable suspension sheave that is mounted on the pipeline launch tower and configured to move relative to the pipeline launch tower;
    an auxiliary tensioning device; and
    a hang-off clamp,
    wherein the pipeline diverter is mounted on the pipeline launch tower and is configured to move relative to the pipeline launch tower, and wherein a pipeline diverter displacement actuator is provided allowing to displace the pipeline diverter between an active position wherein the pipeline passing over the pipeline diverter exits said pipeline diverter aligned with a firing line and a retracted position wherein the pipeline diverter is remote from the firing line,
    wherein the marine pipelaying installation further comprises a controller that is adapted to control an operation of at least the pipeline diverter displacement actuator and the auxiliary tensioning device displacement actuator,
    wherein said controller is adapted to provide retraction signals on the basis of which the pipeline diverter displacement actuator and the auxiliary tensioning device displacement actuator perform a retraction that displaces a pipeline section of said pipeline held between the auxiliary tensioning device and the pipeline diverter away from the firing line,
    wherein said auxiliary tensioning device is an initiation system for initiation of pipelaying, said initiation system comprising an initiation winch, an initiation cable, and an initiation cable sheave, wherein the initiation cable sheave is movable between an active position aligned with the firing line and a retracted position remote from the firing line in order to empty the firing line, wherein the A&R cable is provided with a A&R cable connector, said connector being held near the A&R cable suspension sheave during pipelaying, wherein the installation further comprises a tugger system adapted to pull the A&R cable to an upper end of a seagoing section of the pipeline held by the hang-off clamp in the course of abandonment of the pipeline, said tugger system comprising:

a tugger winch and a tugger cable; and a tugger cable sheave, and wherein, after the step of emptying the firing line, the tugger cable is passable upward from the tugger cable sheave adjacent the upper end of the seagoing section of the pipeline along the firing line to the A&R cable connector, such that the A&R cable connector can be pulled downward towards the upper end of the seagoing section of the pipeline and connected there to the upper end of the seagoing section of the pipeline.

19. A method for installing a pipeline on a seabed from a marine pipelaying vessel, said method comprising pipelaying and abandonment of said pipeline, the marine pipelaying vessel comprises:

a pipeline launch tower;

a pipeline diverter which is supported at an elevated position on the pipeline launch tower;

one or more tensioners supported by the pipeline launch tower below the pipeline diverter;

an abandonment and recovery system (A&R), said A&R system comprising:
    an A&R winch and A&R cable,
    an A&R cable suspension sheave;
    a hang-off clamp;
    an auxiliary tensioning device comprising a mobile arm that is supported on the tower and is movable between an active position and a retracted position, the pipelaying method comprising the steps of:
    lowering the pipeline along a firing line into the sea via the one or more tensioners, said one or more tensioners engaging on the pipeline as so to support a weight of the pipeline, and wherein the abandonment of the pipeline comprises:
    halting the pipelaying and engaging the hang-off clamp with the pipeline at a position below the one or more tensioners;
    transferring the weight of the pipeline onto the hang-off clamp and holding the pipeline in the firing line via the hang-off clamp;
    splitting the pipeline between the hang-off clamp and the one or more tensioners so that an upper section of the pipeline is held by the one or more tensioners and a seagoing section of the pipeline is held by the hang-off clamp;
    connecting the mobile arm in its active position to a lower end of the pipeline held by the one or more tensioners;
    transferring pipeline tension from the one or more tensioners onto the auxiliary tensioning device;
    releasing the one or more tensioners from the upper section pipeline, so that the upper section of the pipeline is held in the firing line between the pipeline diverter and the auxiliary tensioning device;
    emptying the firing line by at least displacing both the pipeline diverter and by displacing the mobile arm of the auxiliary tensioning device to the retracted position thereof and thereby displacing said upper section of the pipeline from the firing line;
    arranging the A&R cable in the firing line emptied by said upper section of the pipeline;
    connecting the A&R cable to an upper end of the seagoing section of the pipeline held by the hang-off clamp in the firing line;
    transferring the weight of the seagoing section of the pipeline from the hang-off clamp onto the A&R cable;
    releasing the hang-off clamp from the seagoing section of the pipeline; and
    operating the A&R winch and thereby lowering the seagoing section of the pipeline onto the seabed.

20. A marine pipelaying installation to be mounted or mounted on a vessel for laying a pipeline on a seabed, wherein the marine pipelaying installation comprises:
    a pipeline launch tower;
    a pipeline diverter which is supported at an elevated position on the pipeline launch tower;
    one or more tensioners supported by the pipeline launch tower below the pipeline diverter;
    an abandonment and recovery system (A&R) configured to abandon and recover of the pipeline, said A&R system comprising:
        an A&R winch and A&R cable; and
        an A&R cable suspension sheave that is mounted on the pipeline launch tower and configured to move relative to the pipeline launch tower;
    an auxiliary tensioning device comprising a mobile arm that is supported on the pipeline launch tower and comprising an auxiliary tensioning device displacement actuator allowing to displace the mobile arm between an active position aligned with a firing line and a retracted position remote from the firing line in order to empty the firing line; and
    a hang-off clamp, wherein the pipeline diverter is mounted on the pipeline launch tower and is configured to move relative to the pipeline launch tower, and wherein a pipeline diverter displacement actuator is provided allowing to displace the pipeline diverter between an active position wherein the pipeline passing over the pipeline diverter exits said pipeline diverter in the firing line and a retracted position wherein the pipeline diverter is remote from the firing line, wherein the marine pipelaying installation further comprises a controller that is adapted to control at least the pipeline diverter displacement actuator and the auxiliary tensioning device displacement actuator, wherein said controller is adapted to provide retraction signals on the basis of which the pipeline diverter displacement actuator and the auxiliary tensioning device displacement actuator perform a retraction that displaces a pipeline section of said pipeline held between the auxiliary tensioning device and the pipeline diverter away from the firing line in order to empty the firing line.

* * * * *